United States Patent
Chan et al.

(10) Patent No.: US 9,968,877 B2
(45) Date of Patent: May 15, 2018

(54) INTELLIGENT AIR-CONDITIONING CONTROLLING SYSTEM AND INTELLIGENT CONTROLLING METHOD FOR THE SAME

(71) Applicant: DELTA ELECTRONICS, INC., Taoyuan County (TW)

(72) Inventors: Ping-Chieh Chan, Taoyuan County (TW); Cheng-Yi Huang, Taoyuan County (TW); Kuo-Shu Tseng, Taoyuan County (TW); Hua-Yi Hsieh, Taoyuan County (TW); Yuan-Ping Hsieh, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 327 days.

(21) Appl. No.: 14/825,938

(22) Filed: Aug. 13, 2015

(65) Prior Publication Data
US 2016/0048142 A1 Feb. 18, 2016

Related U.S. Application Data

(60) Provisional application No. 62/038,076, filed on Aug. 15, 2014.

(51) Int. Cl.
*B01D 46/00* (2006.01)
*H04B 7/24* (2006.01)
(Continued)

(52) U.S. Cl.
CPC ........ *B01D 46/0086* (2013.01); *F24F 3/1603* (2013.01); *F24F 11/0086* (2013.01);
(Continued)

(58) Field of Classification Search
CPC . B01D 46/0086; F24F 3/1603; F24F 11/0012; F24F 11/0015; F24F 11/0034;
(Continued)

(56) References Cited

U.S. PATENT DOCUMENTS 7,185,504 B2   3/2007  Kasai et al.
8,350,697 B2 *  1/2013  Trundle ............... F24F 11/0086
                                             340/539.26
(Continued)

FOREIGN PATENT DOCUMENTS

CN        102529978       7/2012
CN        103024019       4/2013
(Continued)

OTHER PUBLICATIONS

Machine trabslation of JP2007-107782, Azumi Jun, Air Conditioning Control System and Air Conditioning Control Device, Apr. 26, 2007, 37 pages.*

(Continued)

*Primary Examiner* — Sean Shechtman
*Assistant Examiner* — Tri T Nguyen
(74) *Attorney, Agent, or Firm* — Hauptman Ham, LLP

(57) ABSTRACT

An intelligent air-conditioning controlling system comprises an intelligent controlling device, an air-conditioning, a plurality of sensing devices, and a cloud server. The intelligent controlling device receives environment information and user information from the plurality of sensing devices, and calculates a target temperature. The cloud server retrieves a usage record of a user according to the user information, and executes a big data analysis for generating a historical record and recommended environment temperature according to historical data and the environment information. The intelligent controlling device receives the usage record, the historical record and recommended environment tempera- (Continued)

ture and a control parameter from the cloud server, and generates a control command for the air-conditioning in accordance with the target temperature, the usage record, the historical record and recommended environment temperature and the control parameter.

19 Claims, 10 Drawing Sheets

(51) Int. Cl.

| | | |
|---|---|---|
| *G05B 19/042* | (2006.01) | |
| *G05B 19/048* | (2006.01) | |
| *G05D 23/19* | (2006.01) | |
| *H04L 12/28* | (2006.01) | |
| *F24F 3/16* | (2006.01) | |
| *F24F 11/00* | (2018.01) | |

(52) U.S. Cl.
CPC .............. *F24F 11/30* (2018.01); *F24F 11/39* (2018.01); *F24F 11/62* (2018.01); *F24F 11/79* (2018.01); *G05B 19/042* (2013.01); *G05B 19/048* (2013.01); *G05B 19/0428* (2013.01); *G05D 23/1919* (2013.01); *H04B 7/24* (2013.01); *H04L 12/2827* (2013.01); *F24F 2011/0042* (2013.01); *F24F 2011/0093* (2013.01); *F24F 2110/40* (2018.01); *F24F 2120/10* (2018.01); *G05B 2219/2614* (2013.01); *Y02B 60/50* (2013.01); *Y02D 70/00* (2018.01); *Y02P 90/84* (2015.11)

(58) Field of Classification Search
CPC .. F24F 11/006; F24F 11/0078; F24F 11/0086; F24F 2011/0042; F24F 2011/0093; F24F 11/39; F24F 11/62; F24F 11/79; F24F 11/30; F24F 2110/40; F24F 2120/10; G05B 19/042; G05B 19/0428; G05B 19/048; G05B 2219/2614; G05D 23/1919; H04B 7/24; H04L 12/2827; Y02P 90/84; Y02D 70/00; Y02B 60/50

See application file for complete search history.

(56) References Cited

U.S. PATENT DOCUMENTS

| | | | |
|---|---|---|---|
| 8,483,453 B2 | 7/2013 | Yang et al. | |
| 9,633,320 B2* | 4/2017 | Nagata | G06Q 10/04 |
| 2004/0079094 A1 | 4/2004 | Kasai et al. | |
| 2009/0249457 A1* | 10/2009 | Graff | G06F 21/33 726/6 |
| 2010/0025483 A1* | 2/2010 | Hoeynck | F24F 11/001 236/1 C |
| 2012/0170817 A1 | 7/2012 | Yang et al. | |
| 2012/0316687 A1* | 12/2012 | Chen | H02J 3/008 700/276 |

FOREIGN PATENT DOCUMENTS

| | | |
|---|---|---|
| CN | 103123159 | 5/2013 |
| CN | 103727627 | 4/2014 |
| CN | 203687203 | 7/2014 |
| CN | 203704244 | 7/2014 |
| JP | 2003-083590 | 3/2003 |
| JP | 2003-194389 | 7/2003 |
| JP | 2013-068415 | 4/2013 |

OTHER PUBLICATIONS

Machine translation of JP2003-083590, Hashimoto Masahiko, Air-Conditioning System, Mar. 19, 2003, 4 pages.*
Machine translation of KR20100125037, Cha Maeng Q, System for Collecting Environment Data, Nov. 30, 2010, 7 pages.*
Machine translation of JPH0642241 (Y2), Central monitoring and control device, Nov. 2, 1994, 6 pages.*
Office Action dated Mar. 15, 2016 from corresponding application No. JP 2015-157422.
Office Action dated May 5, 2017 from corresponding application No. TW 104121054.

* cited by examiner

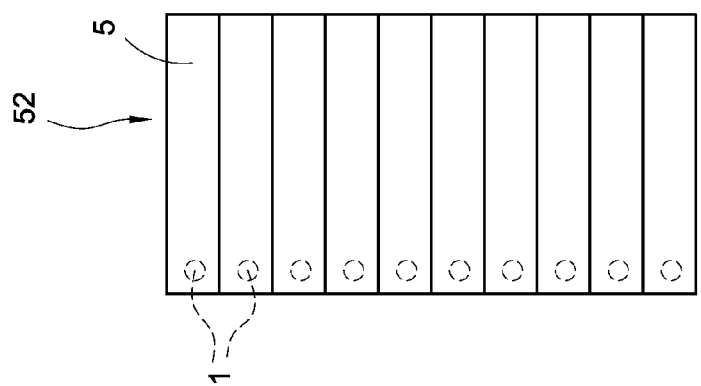
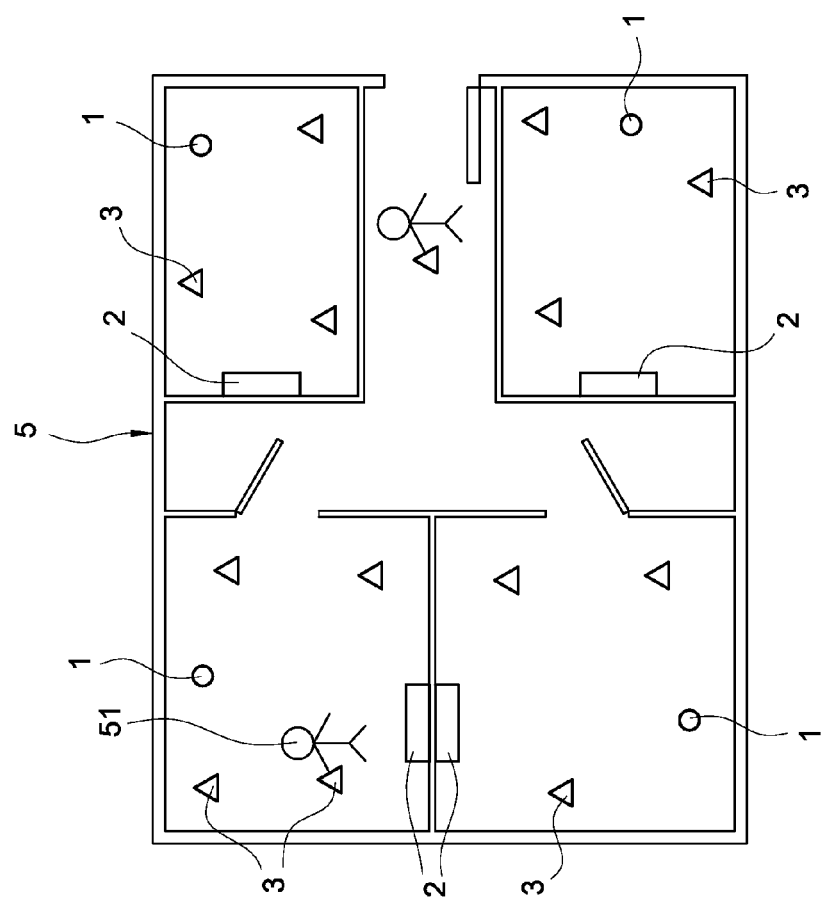
FIG.2B
FIG.2A

INTELLIGENT AIR-CONDITIONING CONTROLLING SYSTEM AND INTELLIGENT CONTROLLING METHOD FOR THE SAME

CROSS-REFERENCE TO RELATED APPLICATION

This patent application claims the benefit of U.S. Provisional Patent Application No. 62/038,076, filed Aug. 15, 2014, which is incorporated by reference herein.

BACKGROUND OF THE INVENTION

1. Field of the Invention

The invention relates to an intelligent controlling system, and in particularly to an intelligent air-conditioning controlling system, and an intelligent controlling method used by the system.

2. Description of Prior Art

For efficiently controlling air-conditionings in a space, there are many types of intelligent air-conditioning system in the market, which equip with a temperature and humidity sensor for sensing temperature information and humidity information around the environment of the space. Therefore, the air-conditionings can operate automatically based on the sensed temperature information and humidity information. For example, the air-conditionings can enter a cooling mode automatically when the environment temperature is too high, enter a heating mode automatically when the environment temperature is too low, or enter a dehumidifying mode when automatically the environment humidity is too high.

However, the current intelligent air-conditioning system in the market only equips with a single sensor, and the arranged position of the sensor may affect the air-conditioning in operation. Further, it may finally lead an intelligent controlling function of the air-conditioning to a bad efficiency.

For example, if the sensor is arranged on a vent of the air-conditioning which is assembled on a ceiling, the temperature sensed by the sensor is easily higher than that on a table height when the air-conditioning is in the heating mode. Therefore, the temperature sensed by the sensor may have a huge difference with the real temperature felt by users. Therefore, the heating mode of the air-conditioning may have a limited efficiency (that because the temperature sensed by the sensor is higher than that on the table height, so a target temperature set by the heating mode will be decreased).

For other example, the fan direction of the current air-conditioning is usually adjusted automatically by the air-conditioning itself or adjusted manually by the user, there is no specific reference. It to say, the current air-conditioning cannot adjust its fan direction according to the indoor temperature, and it may cause the indoor temperature imbalanced, and it also wastes the power consumption.

Besides, the current air-conditioning does not equip with detection function for detecting people indoor, so it cannot execute an accurately controlling operation. For example, if the space the air-conditioning arranged is large, but only few people exists in the space (for example, only one person in the space). In this case, the current air-conditioning still operates according to the temperature sensed by the sensor, so as to increase or decrease the temperature of the entire space. As such, the power consumption will be seriously wasted by the current air-conditioning.

It should be mentioned that some intelligent air-conditioning systems now may equip with a controlling device for controlling the air-conditioning. The current controlling device usually arranged in the same space with the air-conditioning and the sensor, and it usually has a simple calculating capability.

Generally speaking, the current controlling device can only generate a control command for controlling the air-conditioning according to simple information (i.e., the temperature information and the humidity information sensed by the sensor), it cannot calculate complicated information (for example, multiple temperature information, user information, historical data, etc.) at the same time. As such, if only operating by following the control command generated by the controlling device, the air-conditioning cannot reach the purpose of reducing the power consumption, and cannot accurately improve the environment of the arranged space in a short time.

SUMMARY OF THE INVENTION

The object of the present invention is to provide an intelligent air-conditioning controlling system and an intelligent controlling method, which can calculate a control parameter by a cloud server for an intelligent controlling device to generate a control command, so as to save the power consumption in controlling an air-conditioning to operate, and improves the environment of a space as soon as possible.

To achieve the above object, the intelligent air-conditioning controlling system comprises an intelligent controlling device, an air-conditioning, a plurality of sensing devices, and a cloud server. The intelligent controlling device receives environment information of different zones of a space through a plurality of sensing devices, and receives user information of a user located in the space. The intelligent controlling device then calculates a target temperature, and uploads the above data to the cloud server.

The cloud server identifies an identity of the user according to the user information, and retrieves a usage record corresponding to the user. The cloud server executes a big data analysis for generating a historical record and recommended environment temperature according to historical data and the environment information. The intelligent controlling device receives the usage record, the historical record and recommended environment temperature and a control parameter from the cloud server, and generates a control command for controlling the air-conditioning arranged in the space in accordance with the target temperature, the usage record, the historical record and recommended environment temperature and the control parameter. Therefore, the environment of the space can be improved.

In comparison with related art, the present invention executes a big data analysis through the cloud server, so as to calculate a proper temperature for the space according to the historical data and the current environment information of the space. Also, the cloud server is used to calculate the control parameter for the intelligent controlling device to generate the controlling command, therefore, the intelligent controlling device can intelligently control the air-conditioning to operate in an economic way, and the environment of the space can be improved as soon as possible.

BRIEF DESCRIPTION OF THE DRAWINGS

FIG. 2A is a schematic view of space distribution of first embodiment according to the present invention.

FIG. 2B is a schematic view of building distribution of first embodiment according to the present invention.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
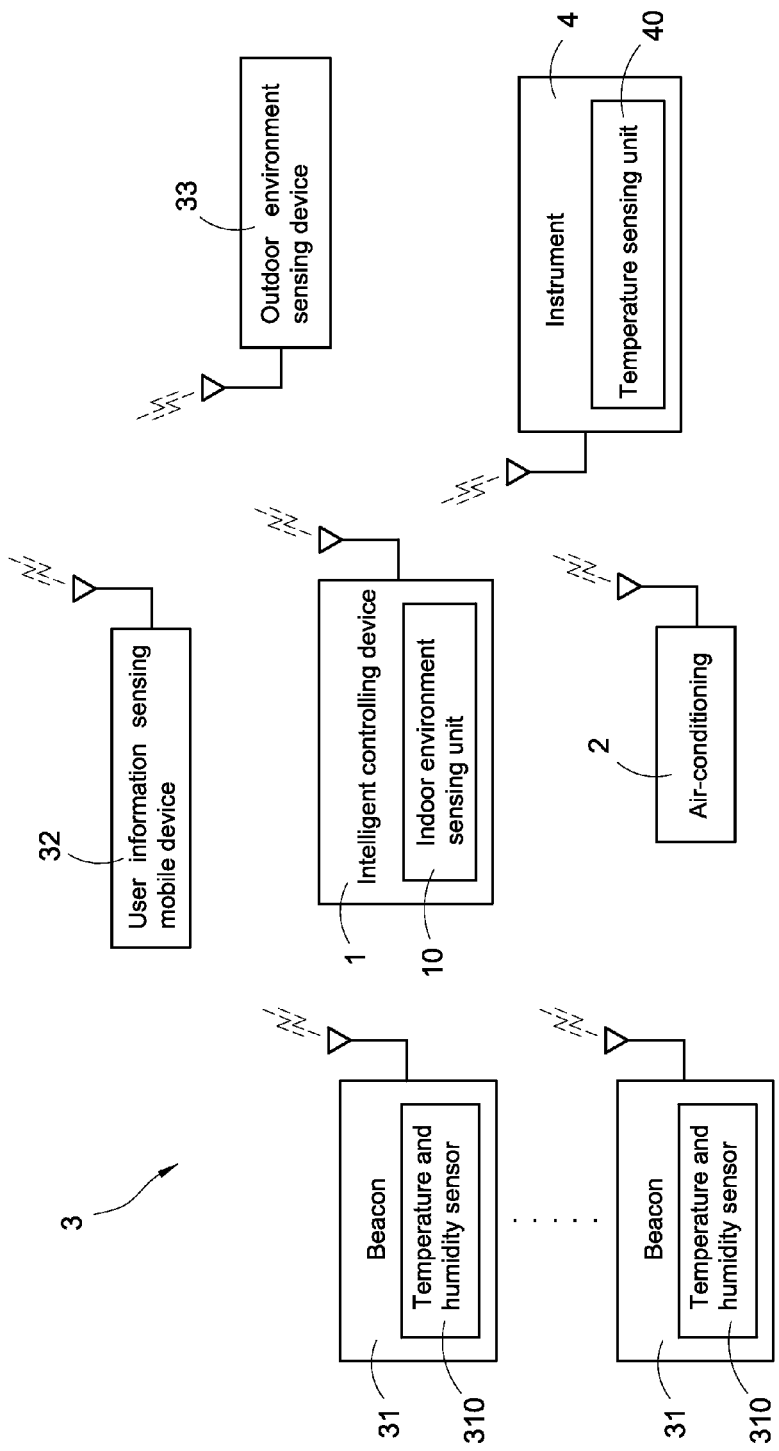
FIG. 1 is a schematic view of intelligent air-conditioning controlling system of first embodiment according to the present invention.

Refers to FIG. 1, FIG. 1 is a schematic view of intelligent air-conditioning controlling system of first embodiment according to the present invention. An exemplary embodiment of the present invention discloses an intelligent air-conditioning controlling system, which comprises an intelligent controlling device 1, an air-conditioning 2 and a plurality of sensing devices 3. In this embodiment, the plurality of sensing devices 3 mainly comprises a plurality of beacons 31 and at least one user information sensing mobile device 32, but not limited thereto.

In this embodiment, the intelligent air-conditioning controlling system is arranged in an indoor space, for example, an office, a meeting room, a stockroom, a houseroom, a living room, etc. The intelligent controlling device 1 is used to control the air-conditioning 2 (also a heat recovery ventilator (HRV), an air-cleaner, an air-circulator, etc) which is arranged in the same space. For easily interpreting, the air-conditioning 2 is used for example in the following embodiments, but not intended to limit the scope of the present invention.

As shown in FIG. 1, the intelligent controlling device 1 in this embodiment comprises an indoor environment sensing unit 10. The indoor environment sensing unit 10 is used to sense environment information around the intelligent controlling device 1, for an instance, to sense indoor temperature, indoor humidity, $CO_2$ quantity, PM2.5 quantity, total volatile organic compound (TVOC) quantity, etc., and generate corresponding indoor temperature information, indoor humidity information, $CO_2$ quantity information, PM2.5 quantity information, TVOC quantity information, etc. Also, the intelligent controlling device 1 is wireless connected with the air-conditioning 2 which is arranged in the same space, and controls the air-conditioning 2 according to the sensed environment information, so as to adjust the comfort characteristic of the arranged space.

The plurality of beacons 31 are respectively arranged at different zones of the space, so as to sense the environment information respectively for each zone of the space. In particularly, the plurality of beacons 31 and the intelligent controlling device 1 are respectively arranged at different zones of the space. In this embodiment, each of the plurality of beacons 31 comprises a temperature and humidity sensor 310. Each beacon 31 respectively senses indoor temperature and indoor humidity of the arranged zone by its temperature and humidity sensor 310, and generates corresponding indoor temperature information and indoor humidity information. Each beacon 31 is wirelessly connected with the intelligent controlling device 1, and provides the sensed environment information to the intelligent controlling device 1.

In this embodiment, the plurality of beacons 31 and the intelligent controlling device 1 may support bluetooth low energy (BLE) transmission technology, and transmit data with each other via BLE transmission interfaces (not shown), but not limited thereto. In accordance with the low power consumption characteristic of BLE technology, the flexibility of installing the plurality of beacons 31 is enhanced. For example, the batteries of the plurality of beacons 31 supporting BLE transmission technology do not need to be changed frequently, so it is helpful for popularizing the intelligent air-conditioning controlling system of the present invention.

As mentioned above, the intelligent controlling device 1 and the plurality of beacons 31 are respectively arranged at different zones of the space, as a result, the intelligent controlling device 1 in this embodiment may control the air-conditioning 2 in accordance with the environment information sensed by the indoor environment sensing unit 10 and the plurality of beacons 31 simultaneously. For an instance, if the indoor temperature sensed by the indoor environment sensing unit 10 is approximate to that sensed by the plurality of beacons 31 (for example, 32° C. to 33° C.), the intelligent controlling device 1 may determine that the current environment temperature of the space is well distributed, but determine the environment of the entire space is an uncomfortable environment. In this situation, the intelligent controlling device 1 may control the air-conditioning 2 to operation directly for lowering the current environment temperature of the space to a target temperature (for example, 22° C.), so as to improve the average temperature of the entire space.

For other example, if a temperature difference between a first indoor temperature sensed by the indoor environment sensing unit 10 and a second indoor temperature sensed by one of the plurality of beacons 31 (for example, a first beacon) is too large (for example, the first indoor temperature is 24° C. and the second indoor temperature is 32° C.), the intelligent controlling device 1 may determine that the environment temperature of the space is unaveraged, and the environment of the zone the first beacon arranged is the uncomfortable environment. In this situation, the intelligent controlling device 1 first determines where the zone the first beacon arranged is, and then controls the air-conditioning 2 to execute an adjusting operation on the zone the first beacon arranged, for example, increasing fan speed and adjusting fan direction, so the air-conditioning 2 can blow cold air toward the zone the first beacon arranged directly.

Therefore, the intelligent controlling device 1 can balance the environment temperature around the entire space, and decrease the temperature of the zone the first beacon arranged. In this embodiment, the air-conditioning 2 only needs to adjust fan speed and fan direction, and a vent of the air-conditioning 2 is adjusted toward the zone, or the volume of the cold air blown toward the zone is increased, therefore, the temperature of the zone the first beacon arranged is decreased. It should be noted that in this embodiment, only the fan speed, the fan direction or the vent direction of the air-conditioning 2 is adjusted, the intelligent controlling device 1 does not need to increase the loading of a compressor of the air-conditioning 2 for decreasing the temperature of the space to reach to the target temperature, for lowing the power consumption of the air-conditioning 2.

The user information sensing mobile device 32 is carried by a user (such as a user 51 shown in FIG. 2A), so as to sense user information of the user 51, or to sense the environment information around the user 51. For example, the user information sensing mobile device 32 can be a smart watch, which is worn on a wrist by the user 51 and senses the user information, such as heartbeat or body temperature of the user 51. For other example, the user information sensing mobile device 32 can be a smart phone, which equips with heartbeat sensing function and body temperature sensing function. When the user 51 uses the smart phone correctly, the smart phone can sense the user information, such as heartbeat and body temperature of the user 51. Furthermore, the user information sensing mobile device 32 can also be other type of smart phone, which equips with temperature sensing function and humidity sensing function, and can be used to sense the environment information, such as indoor temperature or indoor humidity around the user 51.

The user information sensing mobile device 32 is wirelessly connected with the intelligent controlling device 1. In particularly, when the user 51 who carries the user information sensing mobile device 32 enters the space where the intelligent air-conditioning controlling system is arranged, the user information sensing mobile device 32 establishes a wireless connection with the intelligent controlling device 1 automatically (for example, through the above mentioned BLE transmission interfaces), and transmits the sensed user information and/or the sensed environment information to the intelligent controlling device 1 automatically after the wireless connection is established.

In this embodiment, the intelligent controlling device 1 may determine how to control the air-conditioning 2 properly by cooperating with the user information sensing mobile device 32. For example, the intelligent controlling device 1 may obtain the user information from the user information sensing mobile device 32, and uses the obtained user information to control the fan speed, the fan direction or operation modes applied by the air-conditioning 2. For a certain instance, if the user information indicates that the body temperature of the user 51 is too high, the intelligent controlling device 1 may adjust the target temperature or the fan speed of the air-conditioning 2 in accordance with the position of the user 51, so as to make the user 51 to feel comfortable. For other instance, if the user information indicates that the body temperature of the user 51 is too low, the intelligent controlling device 1 can control the air-conditioning 2 to enter a heating mode, so as to solve the low body temperature problem of the user 51.

In one exemplary embodiment, the position of the user 51 can be determined through received signal strength index (RSSI) among the user information sensing mobile device 32 (a device which can support BLE communication protocol), the intelligent controlling device 1 and at least one of the plurality of beacons 31. For example, the position can be calculated by using a triangulation positioning method.

Besides, the intelligent controlling device 1 may determine the amount of the users 51 in the space through the amount of the obtained user information. If there are only few users 51 in the space (e.g., the amount of the user 51 in the space is lower than a threshold), the intelligent controlling device 1 may control the air-conditioning 2 to execute the adjusting operation based on the positions of the users 51. For example, the intelligent controlling device 1 obtains the positions of the users 51 in the space through the above mentioned RSSI application, and controls the fan speed and the fan direction of the air-conditioning 2 according to the positions. Therefore, the air-conditioning 2 may blow the cold air toward the users 51 directly. As such, the intelligent controlling device 1 can make the users 51 to feel comfortable without decreasing the target temperature, so the power consumption is efficiently saved.

It should be mentioned that the user information can comprises an unique identification information in one embodiment, so the intelligent controlling device 1 can identify the user 51 through the user information. In one embodiment, the user information sensing mobile device 32 can be an employee identification card having wireless transmission function (for example, BLE, Wi-Fi, Zigbee, RF, NFC, etc.), and the identification information is an employee identification number. In other embodiment, the user information sensing mobile device 32 can be a smart phone, and the identification information is an international mobile equipment identity (IMEI) of the smart phone. In another embodiment, the user information sensing mobile device 32 can be a tablet, a laptop or a smart watch, and the identification information is a media access control (MAC) address of a network card or a bluetooth transmission unit. However, the above descriptions are just embodiments of the present invention, not intended to limit the scope of the present invention.

In one embodiment, the intelligent controlling device 1 is preset and stored the identification information of the user 51, and stored a usage record of the user 51. When the user 51 enters the space and the user information sensing mobile device 32 transmits the identification information to the intelligent controlling device 1, the intelligent controlling device 1 can identify an identity of the user 51 according to the identification information (for example, in comparison with a look up table). After identifying the identity of the user 51, the intelligent controlling device 1 retrieves the usage record corresponding to the user 51, and controls the air-conditioning 2 to execute a proper adjustment on the usage record of the user 51. The usage record can be, for example, an usage habit of the user 51 in a default period (such as the past three months, or the current month for the past three years). In this example, the usage record is corresponding to the target temperature the intelligent controlling device 1 set based on the user demand in the default period.

Figure 5:
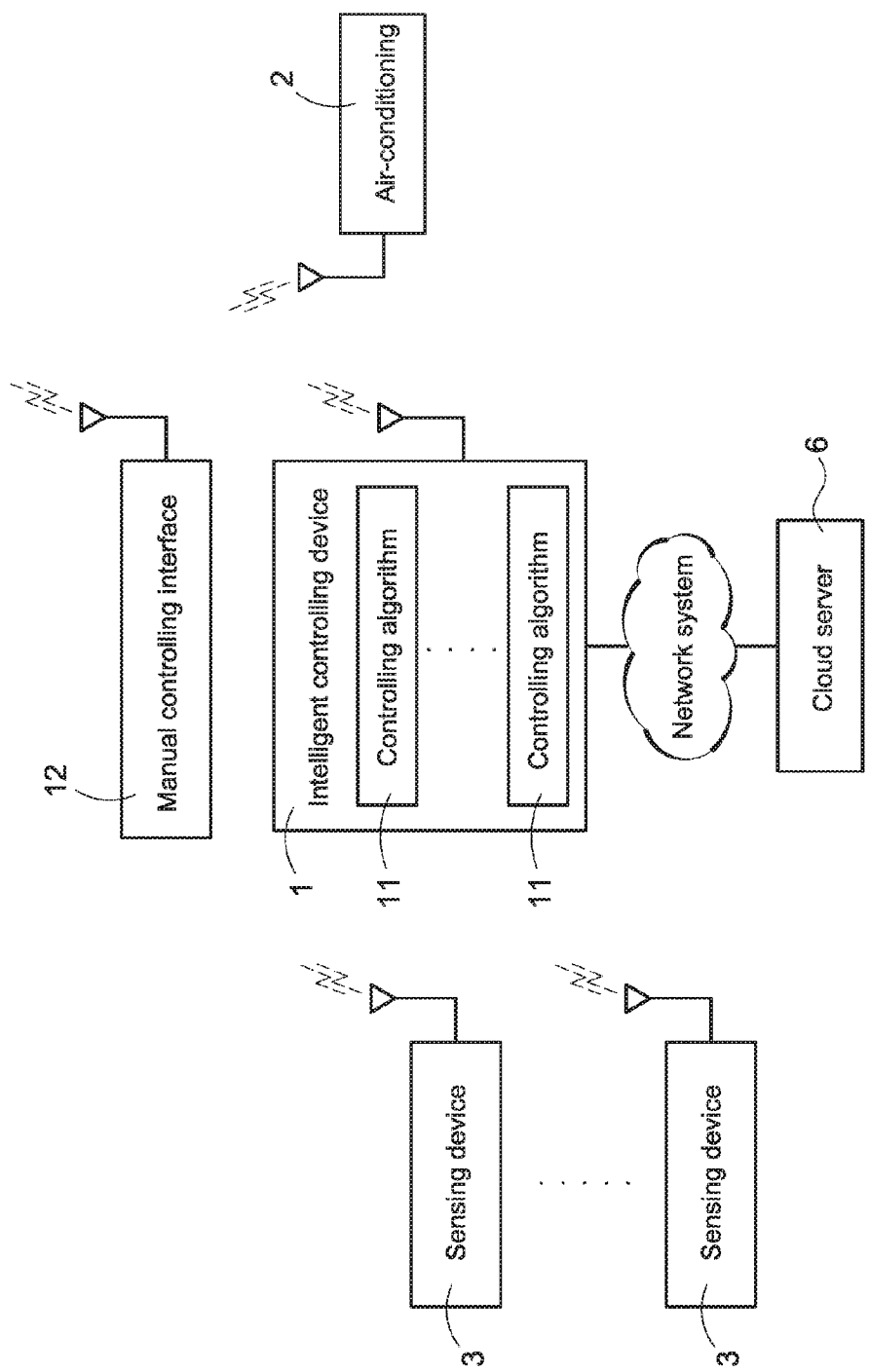
FIG. 5 is a schematic view of intelligent air-conditioning controlling system of second embodiment according to the present invention.

In other embodiment, the identification information and the usage record can be stored in a cloud server (such as a cloud server 6 shown in FIG. 5). After receiving the identification information in this embodiment, the intelligent controlling device 1 uploads the identification information to the cloud server 6 for identifying the identity of the user 51. After identifying the identity of the user 51 and obtaining the usage record corresponding to the user 51, the cloud server 6 transmits the obtained usage record to the intelligent controlling device 1 for following procedures.

The plurality of sensing devices 3 further comprises an outdoor environment sensing device 33, which is wirelessly connected with the intelligent controlling device 1. In this embodiment, the intelligent controlling device 1 and the plurality of beacons 31 are arranged indoor, the user information sensing mobile device 32 is carried by the user 51, and the outdoor environment sensing device 33 is arranged outdoor. The outdoor environment sensing device 33 in this embodiment is used to sense an outdoor temperature, an outdoor humidity, an outdoor air quality, etc., and generate corresponding outdoor temperature information, outdoor humidity information, outdoor air quality information, etc.

In this embodiment, the intelligent controlling device 1 can efficiently increase controlling quality of controlling the air-conditioning 2 by cooperating with the outdoor environment sensing device 33. For an instance, if receiving the outdoor temperature information from the outdoor environment sensing device 33 and determining the outdoor temperature is too low, the intelligent controlling device 1 controls the air-conditioning 2 to adjust indoor temperature slowly when the user 51 enters the space, therefore, it can prevent the user 51 from feeling uncomfortable because the large temperature difference between the outdoor temperature and the indoor temperature. For other instance, when receiving the outdoor air quality information and determining the outdoor air quality is bad, the intelligent controlling device 1 controls the air-conditioning 2 to stop a large amount air circulating between inside and outside and executes an air cleaner function, so as to increase the air quality in the space via a filter of the air-conditioning 2.

The intelligent controlling device 1 basically receives the environment information, the user information, the outdoor temperature information, the outdoor humidity information and the outdoor air quality information from the plurality of sensing devices 3. Besides, if there is one or more than one instruments 4 in the space, the intelligent controlling device 1 can also receive instrument temperature information from the instruments 4.

For example, one of the instruments 4 can be a projector equipped with temperature sensing function and wireless transmission function. The projector will generate high temperature when operating, and the projector itself can sense its temperature, generate corresponding instrument temperature information and transmit the generated instrument temperature information to the intelligent controlling device 1. When determining the temperature of the projector is too high according to the received instrument temperature information, the intelligent controlling device 1 can control the fan direction of the air-conditioning 2, so the air-conditioning 2 can blow the cold air toward the projector directly. Therefore, the temperature of the projector is decreased without operating the compressor of the air-conditioning 2, and the life time of the projector is then extended.

Moreover, the intelligent air-conditioning controlling system in other embodiment can be arranged directly in a room where one or more instruments 4 are arranged. In this embodiment, the intelligent controlling device 1 receives the instrument temperature information from the instruments 4, and controls the air-conditioning 2 arranged in the same room through above described controlling way. Therefore, the environment of the room is improved, and the instruments 4 arranged in the room is prevented from being damaged by the heat of the room.

It should be mentioned that the intelligent air-conditioning controlling system can further comprises one or more light detecting apparatuses (not shown) in other embodiment. Each light detecting apparatus can generate a status information indicating its ON/OFF status when being turned on or off, and the intelligent controlling device 1 can determine whether a person enters or leaves the space based on the status information of the light detecting apparatus and other information sensed by at least one of the sensing devices 3. For example, if the light detecting apparatus is turned on, and the status information indicates ON, the intelligent controlling device 1 can determine that a person enters the space. For other example, if the light detecting apparatus is turned off, the status information indicates OFF, and the information sensed by the sensing device 3 indicates that the $CO_2$ quantity performs a downward trending in an unit time, the intelligent controlling device 1 can then combine these information and determine whether all person in the space are left or not. As such, the intelligent controlling device 1 in the present invention can control the air-conditioning 2 more efficiently by reference to the environment information and the user information simultaneously, so as to reach the power consumption saving purpose.

The intelligent air-conditioning controlling system can further comprises one or more sound sensor (not shown) in other embodiment. The sound sensor is used to sense sound of the space and generate corresponding sound information. The intelligent controlling device 1 is connected with the sound sensor for obtaining the generated sound information. In this embodiment, the intelligent controlling device 1 combines the sound information and the information sensed by at least one of the sensing devices 3 to determine whether a person exists in the space or not. As such, the intelligent controlling device 1 in the present invention can control the air-conditioning 2 more efficiently by reference to the environment information and the user information simultaneously, so as to reach the power consumption purpose.

In a preferred embodiment, the sound sensor is arranged around or inside the air-conditioning 2. The intelligent controlling device 1 can determine whether the abnormal sound of a component of the air-conditioning 2 is generated. If the component of the air-conditioning 2 generates the abnormal sound, the intelligent controlling device 1 determines that a failure of the air-conditioning 2 may occur, so as to notify a maintenance staff directly to repair the air-conditioning 2. By using the sound sensor, a manager does not need to schedule the maintenance staff to check the air-conditioning 2 periodically, so the labor costs is efficiently reduced.

Moreover, the intelligent air-conditioning controlling system can further comprises one or more pressure sensor (now shown) in other embodiment. The pressure sensor is used to sense the pressure of the space and generate corresponding pressure information. The intelligent controlling device 1 is connected with the pressure sensor for obtaining the pressure information. In this embodiment, the intelligent controlling device 1 can determine the current whether is good or bad (i.e., it is a sunny day, a cloudy day or a rainy day) in accordance with the indoor environment information, the outdoor environment information and the pressure information.

Moreover, if the pressure sensor is arranged inside the air-conditioning 2, it can then be used to sense a pressure variation in the air-conditioning 2 (such as a wind pressure variation), and transmit the sensed pressure variation to the intelligent controlling device 1. Therefore, if the pressure in the air-conditioning 2 is larger than a threshold, the intelligent controlling device 1 can determine that the filter of the air-conditioning 2 is obstructed, so as to notify the maintenance staff directly to change the filter. By using the pressure sensor, the manager does not need to schedule the maintenance staff to check and change the filter of the air-conditioning 2 periodically, so the labor costs is efficiently reduced.

It should be mentioned that the above mentioned sound sensor and pressure sensor can be independent sensors which are arranged respectively, or they can also be integrated together in the intelligent controlling device 1, not limited thereto.

In other embodiment, if the indoor environment sensing unit 10 equips with a sensing function for sensing CO2 quantity, the intelligent controlling device 1 can determine that at least one user 51 exists in the space if the sensed CO2 quantity information is increased gradually, and the intelligent controlling device 1 can then properly controls the air-conditioning 2. Besides, if the sensed CO2 quantity information is exploded in an unit time, the intelligent controlling device 1 can determine that maybe the space is encountering a fire, so as to notify a security organization to deal with the problem.

If the indoor environment sensing unit 10 equips with PM2.5 quantity sensing function or TVOC quantity sensing function, the intelligent controlling device 1 can further determine the air quality in the space is good or bad, or determine if a fire occurs or not, based on the PM2.5 quantity information or the TVOC quantity information. Therefore, the intelligent controlling device 1 can decide to control the air-conditioning 2 properly to improve the environment, or to notify the security organization to deal with the problem.

Refers to FIG. 2A and FIG. 2B, FIG. 2A is a schematic view of space distribution of first embodiment according to the present invention, FIG. 2B is a schematic view of building distribution of first embodiment according to the present invention. As shown in FIG. 2A, the intelligent air-conditioning controlling system in this embodiment is arranged in an indoor environment area 5 (such as a plane floor). In particularly, if there are many spaces (such as many rooms) in the environment area 5, then each space can be respectively arranged with one intelligent air-conditioning controlling system, i.e., each space is respectively arranged with one intelligent controlling device 1, one air-conditioning 2 and a plurality of sensing devices 3 as mentioned above.

The user 51 in the environment area 5 may carry one of the plurality of sensing devices 3 (such as the user information sensing mobile device 32) for sensing the user information of the user 51. When the user 51 enters any space of the environment area 5, the user information will be transmitted to the intelligent controlling device 1 in the space through the user information sensing mobile device 32.

As shown in FIG. 2B, if a building 52 includes a plurality of plane floors (i.e., the building 52 has a plurality of environment areas 5), and each environment area 5 is respectively arranged with at least one intelligent air-conditioning controlling system, therefore, a central server (not shown) of the building 52 is connected with all intelligent controlling devices 1 of the building 52, so as to obtain all of the environment information and all of the user information from all spaces. As such, a manager of the building 52 can efficiently monitor the situation of all spaces in the building 52. Additionally, the manager can set proper operating modes respectively for each intelligent air-conditioning controlling system arranged in each space, so as to save the power consumption of the whole building 52 (detailed described as following).

It should be mentioned that human's body temperature is usually higher than environment temperature, and as described above, the central server can obtain the environment information and the user information from all spaces of the building 52. As a result, the central server can find out the current position of all users 51 in the building 52 based on the obtained environment information and user information.

Figure 3:
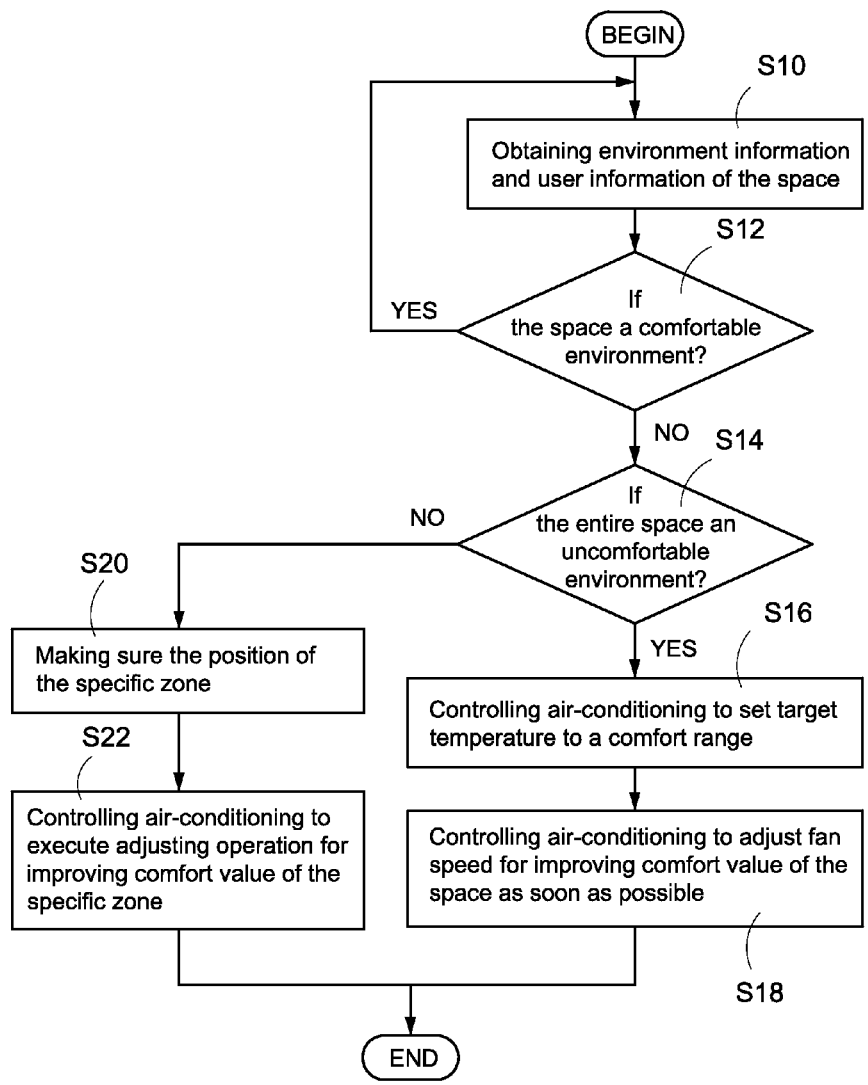
FIG. 3 is an intelligent controlling flowchart of first embodiment according to the present invention.

FIG. 3 is an intelligent controlling flowchart of first embodiment according to the present invention. The embodiment shown in FIG. 3 discloses an intelligent controlling method applied by the intelligent air-conditioning controlling system disclosed in the above embodiments of the present invention. As shown in FIG. 3, the intelligent controlling device 1 first obtains the environment information and the user information of the space where the intelligent controlling device 1 is arranged from the indoor environment sensing unit 10 and the plurality of sensing devices 3 (step S10). Then, the intelligent controlling device 1 determines whether the environment of the space is a comfortable environment or not according to the environment information and the user information (step S12). Moreover, if the instrument 4 exists in the space, the intelligent controlling device 1 can then obtain the environment information, the user information and the instrument temperature information simultaneously, and determines whether the environment of the space is the comfortable environment or not according to the environment, the user information and the instrument temperature information.

In this embodiment, the intelligent controlling device 1 can be preset a plurality of groups of comfort definition lookup table. For example, a first comfort definition lookup table defines that the indoor temperature is felt comfortable between 24° C. to 28° C. if the number of the user 51 is less than five persons. For other example, a second comfort definition lookup table defines that the indoor temperature is felt comfortable between 22° C. to 25° C. if the number of the user 51 is more than five persons. In the step S12, the intelligent controlling device 1 can compare the environment information and the user information with the plurality of groups of comfort definition lookup table, so as to determine whether the space is the comfortable environment.

Besides, the intelligent controlling device 1 can also upload the environment information and the user information to the cloud server 6 after receiving the environment information and the user information, and a task of determining whether the environment of the space is the comfortable environment or not is executed by the cloud server 6 in this embodiment. In other words, the plurality of groups of comfort definition lookup table are stored in the cloud server 6, or the cloud server 6 can also complete the above task through executing a big data analysis procedure.

If the environment of the space is determined as the comfortable environment by the intelligent controlling device 1, the method goes back to the step S10, and the intelligent controlling device 1 keeps receiving the environment information and the user information and determines whether the environment of the space is the comfortable environment continually. If the environment of the space is determined as an uncomfortable environment, the method then determines whether the environment of the entire space is the uncomfortable environment or not (step S14). In particularly, the intelligent controlling device 1 in the step S14 uses the environment information and the user information to determine whether the environment of the entire space the intelligent controlling device 1 arranged is the uncomfortable environment (for example, the average temperature is too high in the entire space), or if only the environment of one or more specific zones in the space are the uncomfortable environment (for example, only the temperature of a position where the user 51 located is too high, or only the temperature of a position where the instrument 4 arranged is too high, or only the temperature of a position where one of the beacons 31 arranged is too high).

If the intelligent controlling device 1 determines that the environment of the entire space is the uncomfortable environment, it can directly control the air-conditioning 2 to set the target temperature within a comfort range (step S16). For example, if the average temperature of the space is 31° C., but the comfort range is within 22° C. to 25° C., in this case, the intelligent controlling device 1 can directly set the target temperature of the air-conditioning 2 in 22° C. to 25° C. Therefore, the air-conditioning 2 may turn on the compressor and blow the cold air, so as to decrease the average temperature of the space to the comfort range of 22° C. to 25° C.

It should be noted that the intelligent controlling device 1 in this embodiment generates a control command based on the environment information and the user information, and controls the air-conditioning 2 to set or adjust the target temperature according to the control command. The intelligent controlling device 1, in other embodiment, uploads the environment information and the user information to the cloud server 6, and the cloud server 6 calculates a control parameter (for example, percentages of each of the information occupied in the control command) through an algorithm. Then, the intelligent controlling device 1 generates the control command in accordance with the environment information, the user information and the control parameter simultaneously. However, the above descriptions are just embodiments of the present invention, not intended to limit the scope of the present invention.

After the step S16, the intelligent controlling device 1 may further control the air-conditioning 2 to adjust its fan speed based on the uncomfortable degree of the space (step S18), so as to improve the comfort characteristic of the space as soon as possible. For example, the intelligent controlling device 1 can control the air-conditioning 2 to adjust its fan speed to HIGH when the average temperature exceeds 30° C., and adjust its fan speed to MIDDLE when the average temperature is within 28° C. to 30° C.

If the intelligent controlling device 1 determines that only the environment of one specific zone of the space is the uncomfortable environment in the step S14, it then determines the position of the specific zone through the plurality of sensing devices 3 (step S20). In particularly, the intelligent controlling device 1 in this embodiment stores an arranged position of each beacon 31 and each instrument 4 when being arranged at the beginning. When the user 51 enters the space, the intelligent controlling device 1 can receive the position of the user information sensing mobile device 32 carried by the user 51 immediately. As such, the environment information and the user information are respectively corresponding to different zones of the space by the intelligent controlling device 1, so the intelligent controlling device 1 can determine the position of the specific zone via these information.

After the step S20, the intelligent controlling device 1 controls the air-conditioning 2 to execute the adjusting operation on the specific zone, so as to improve the comfort characteristic of the specific zone (step S22). In particularly, the adjusting operation controlled by the intelligent controlling device 1 in this embodiment comprises adjusting a blowing direction (i.e., the fan direction), the fan speed, an air inducting amount or an air exhausting amount of the air-conditioning 2. The purpose of executing the adjusting operation is to improve the comfort characteristic of the specific zone, not the entire space. Therefore, the purpose of improving the comfort characteristic of the specific zone can be easily accomplished through an economic way, so as to reduce the entire power consumption.

Figure 4A:
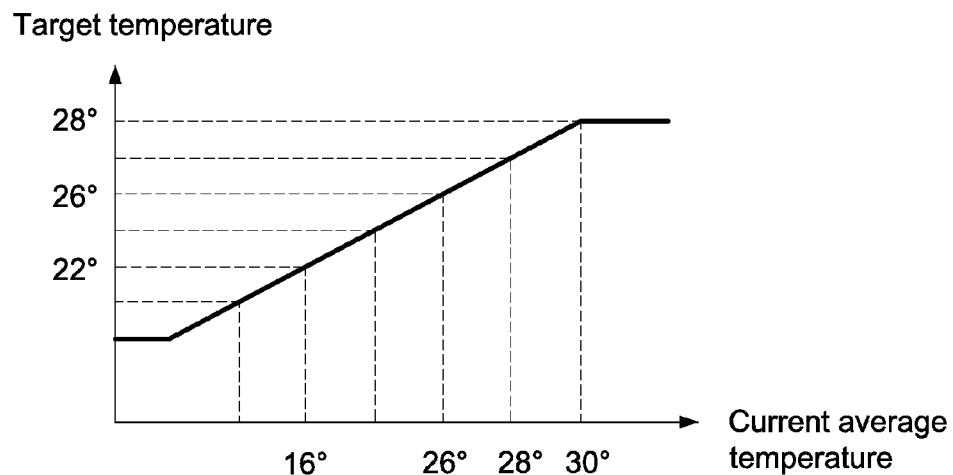
FIG. 4A is a schematic view of setting temperature of first embodiment according to the present invention.
Figure 4B:
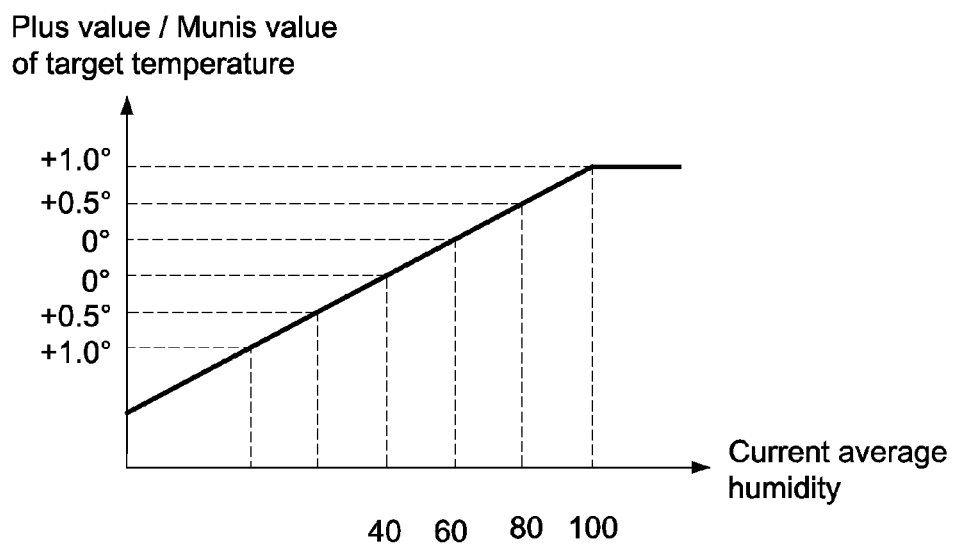
FIG. 4B is a schematic view of increasing or decreasing temperature of first embodiment according to the present invention.

Refers to FIG. 4A and FIG. 4B, FIG. 4A is a schematic view of setting temperature of first embodiment according to the present invention, FIG. 4B is a schematic view of increasing or decreasing temperature of first embodiment according to the present invention. FIG. 4A discloses an embodiment of setting the target temperature by the intelligent controlling device 1. In this embodiment, the intelligent controlling device 1 can record the environment temperature and humidity of the space in a period of time before the air-conditioning 2 is turned on (for example, an hour before the air-conditioning 2 is turned on). When the air-conditioning 2 is turned on, the intelligent controlling device 1 first determines a preferred target temperature range for the space at the beginning in accordance with an average value of the recorded environment temperature and humidity, and then generates tables shown in FIG. 4A and FIG. 4B. Therefore, during the operating of the air-conditioning 2, the intelligent controlling device 1 can generate the target temperature based on the above mentioned tables. Besides, the tables can also be pre-stored in the intelligent controlling device 1 while the intelligent controlling device 1 was produced, but not limited thereto.

As shown in FIG. 4A, for example, when determining the environment of the entire space is the uncomfortable environment and the current average temperature of the space is higher than 26° C., the intelligent controlling device 1 controls the air-conditioning 2 to turn on its compressor and enter a cooling mode, and the air-conditioning 2 is controlled to set the target temperature according to the current average temperature. If the current average temperature of the space is then decreased, the air-conditioning 2 in the cooling mode is controlled to increase the target temperature.

Besides, if the current average temperature of the space is lower than 16° C., the intelligent controlling device 1 controls the air-conditioning 2 to enter a heating mode, and the air-conditioning 2 is controlled to set the target temperature according to the current average temperature. If the current average temperature of the space is then increased, the air-conditioning 2 in the heating mode is controlled to decrease the target temperature.

It should be noted that the intelligent controlling device 1 can also determine whether the environment of the entire space is the uncomfortable environment or not in accordance with a current average humidity of the space. Also, human may feel different temperature because of the variation of environment humidity. As a result, to set the target temperature based on the current average humidity can efficiently reduce the power consumption.

FIG. 4B discloses other embodiment of setting the target temperature by the intelligent controlling device 1. When the intelligent controlling device 1 decides the target temperature, and the current average humidity of the space is 60%, it can control the air-conditioning 2 to operate at the target temperature directly. When the current average humidity of the space increases to 80%, the intelligent controlling device 1 can increase the target temperature by 0.5° C. When the current average humidity of the space increases to 100%, the intelligent controlling device 1 can increase the target temperature by 1° C. Therefore, the power consumption can be saved without affecting the perception of the user 51 in feeling the temperature.

Additionally, the intelligent air-conditioning controlling system in the present invention can obtain the outdoor temperature information, the outdoor humidity information, the outdoor air quality information from the outdoor environment sensing device 33. Therefore, the intelligent controlling device 1 can duly induct a certain percentage of outdoor air into the space (for example, if the air quality of the outdoor air is better than that indoor, and the outdoor temperature is lower than that indoor), then the environment of the space can be efficiently improved in an economic way.

The intelligent controlling device 1 in the present invention basically determines whether to control the air-conditioning 2 automatically or not (for example, turning the air-conditioning 2 on, setting the temperature, switching the modes, adjusting the fan speed and the fan direction, etc), based on the information sensed by the plurality of sensing devices 3. If the intelligent controlling device 1 decides to control the air-conditioning 2, it then calculates the control command for controlling the air-conditioning 2 according to the obtained environment information and the obtained user information.

FIG. 5 is a schematic view of intelligent air-conditioning controlling system of second embodiment according to the present invention. As described in the above embodiments, the intelligent controlling device 1 can generate the control command by itself according to the environment information and the user information, or upload the environment information and the user information to the cloud server 6 for the cloud server 6 to calculate the control parameter, and the intelligent controlling device 1 then calculates the control command according to the environment information, the user information and the control parameter obtained from the cloud server 6 simultaneously.

In the embodiment shown in FIG. 5, the intelligent controlling device 1 connects to the cloud server 6 through a network system. The cloud server 6 receives the environment information and the user information uploaded by the intelligent controlling device 1, and calculates the control parameter via executing a big data analysis in accordance with the received information and historical data recorded in a database (not shown).

In particularly, the intelligent controlling device 1 records one or more controlling algorithms 11, each of the controlling algorithms 11 is respectively corresponding to different types of the control command, wherein each type is corresponding to different apparatuses, and corresponding to different function or modes. For an instance, if the controlled apparatus is the air-conditioning 2, the control command can be "turns on the air-conditioning 2", "sets the temperature", "switches the mode", "turns on the compressor", "adjusts the fan speed", "adjusts the fan direction", etc. In other embodiments, the control command can also be corresponding to different function and modes of different apparatuses, such as a heating ventilating and air conditioning (HVAC), a heat recovery ventilator (HRV), an air-cleaner, etc., but not limited thereto.

In this embodiment, the intelligent controlling device 1 inputs the environment information (including the indoor temperature, the indoor humidity, the outdoor temperature, the outdoor humidity, the outdoor air quality, the pressure, etc.), the user information (including the body temperature, the heartbeat, the usage record of the user 51) and the control parameter to the corresponding controlling algorithm 11, so as to calculates one or more control commands. Specifically, the calculated control commands are used to control the air-conditioning 2 in this embodiment to execute corresponding adjusting operations, so as to improve the comfort characteristic of the entire space or the specific zone of the space.

Figure 6:
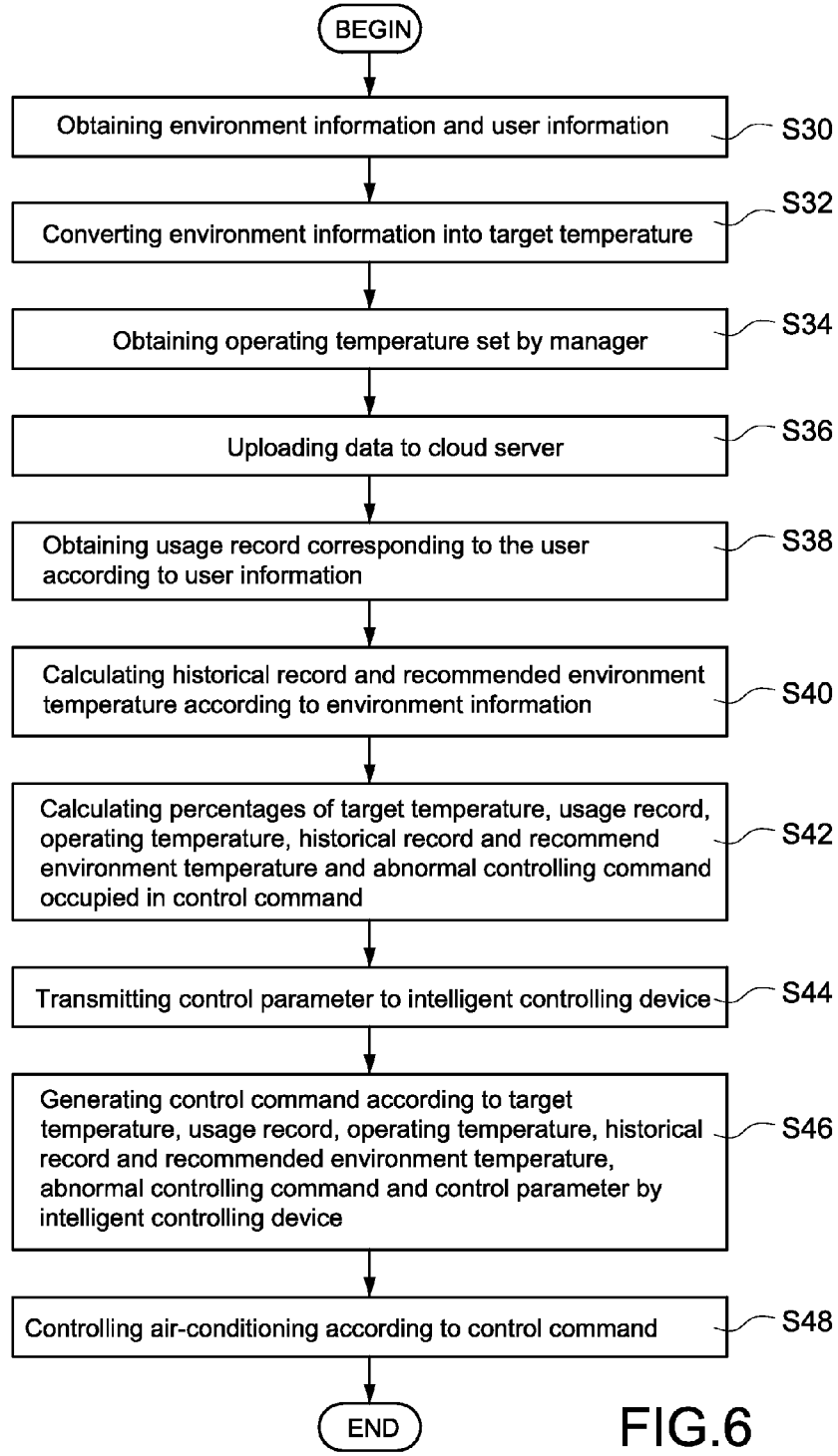
FIG. 6 is a cloud computing flowchart of second embodiment according to the present invention.

FIG. 6 is a cloud computing flowchart of second embodiment according to the present invention. The embodiment shown in FIG. 6 discloses a control flow of the intelligent controlling device 1 to automatically calculate the target temperature of the air-conditioning 2 through the control command. The intelligent controlling device 1 first obtains the environment information through the indoor environment sensing unit 10, the plurality of beacons 31, the outdoor environment sensing device 33 and the temperature sensing unit 40, and obtains the user information through the user information sensing mobile device 32 (step S30), and then converts the environment information into the target temperature of the air-conditioning 2 according to the tables shown in FIG. 4A and FIG. 4B (step S32). Additionally, the intelligent controlling device 1 in this embodiment also obtains an operating mode from the central server of the building 52, wherein the operating mode is set for the space by a manager of the building 52 (step S34).

As described above, the manager can preset different operating modes based on the feature of the space where the intelligent air-conditioning controlling system arranged, such as a meeting room or an office. The operating modes can be, for example, a normal mode, an economic mode, etc. The intelligent controlling device 1 in this embodiment is pre-stored a mode mapping table (not shown). After obtaining the preset operating mode, the intelligent controlling device 1 can check the mode mapping table by using the obtained operating mode, so as to obtain an operating temperature corresponding to the obtained operating mode (For example, the normal mode is corresponding to 25° C., and the economic mode is corresponding to 27° C.).

After the step S34, the intelligent controlling device 1 uploads the environment information, the target temperature, the user information and the operating temperature to the cloud server 6 (step S36). It should be mentioned that the operating temperature in this embodiment can be ignored. Particularly, if the manager of the building 52 does not preset any feature for the space, the intelligent controlling device 1 will not obtain the operating mode, so the operating temperature will not exist.

Further, after receiving the above information, the cloud server 6 first identifies the identity of the user 51 through the identification information included in the user information, and then obtains the usage record corresponding to the user 51 from the database (step S38). In this embodiment, the usage record indicates one or more setting operations made before by the user 51 in this space.

In particularly, the intelligent air-conditioning controlling system in this embodiment further comprises a manual controlling interface 12, which is connected to the intelligent controlling device 1 wirelessly or physically through a cable, or arranged directly on the intelligent controlling device 1. In this embodiment, the manual controlling interface 12 is a physical interface, such as buttons or a touch screen. In other embodiments, the manual controlling interface 12 can also be virtual interface, such as a webpage or an application program wirelessly connected to the intelligent controlling device 1, but not limited thereto.

In a normal case, the intelligent air-conditioning controlling system controls the air-conditioning 2 automatically according to the situation of the space and the user 51. If the user 51 feels uncomfortable in the space, he or she can send feedback information through operating the manual controlling interface 12 (for example, presses a feedback option indicating the current environment is too hot or too cold). Therefore, the intelligent controlling device 1 adjusts the current control command in accordance with the feedback information. Also, the intelligent controlling device 1 uploads the feedback information to the cloud server 6, and the feedback information is then stored in the database and regarded as the usage record of the user 51.

After the step S36, the cloud server 6 further calculates a historical record and recommended environment temperature according to the environment information (step S40). In particularly, the cloud server 6 records all historical record of the space, for example, the indoor temperature and humidity and the outdoor temperature and humidity of the space of each phase in last year, and the operations done for improving the comfort characteristic of the space at that time. Also, the cloud server 6 can obtain definition parameters about preferred comfort characteristics in different temperature and humidity defined by others in the world through the internet. In this embodiment, the cloud server 6 executes the big data analysis based on the above mentioned data for calculating the historical record and recommended environment temperature, i.e., the cloud server 6 executes the big data analysis, and finds out a best temperature applied for the space in the current time and the current environment.

Then, the cloud server 6 calculates percentages for the target temperature, the usage record, the operating temperature, the historical record and recommend environment temperature and an abnormal controlling command occupied in a control command respectively (step S42), and regards the percentages as the control parameter. In other words, each control command is generated based on the target temperature, the usage record, the operating temperature, the historical record and recommended environment temperature and the abnormal control command. It should be mentioned that the abnormal control command can be ignored in some cases (as following descriptions).

After the step S42, the cloud server 6 transmits the control parameter to the intelligent controlling device 1 (step S44). In this embodiment, the cloud server 6 also transmit the obtained usage record and the generated historical record and recommended environment temperature to the intelligent controlling device 1 for calculating and generating the control command.

It should be mentioned that if there are several users 51 in the space, the cloud server 6 can respectively identify the identity of each user 51, and obtain the usage record corresponding to each user 51 respectively. Also, the cloud server 6 identifies further information for each user 51, for example, an authority of each user 51, an amount of entering the space of each user 51, etc. In this embodiment, the cloud server 6 calculates different percentages for each usage record of each user 51 based on the above information.

After the step S44, the intelligent controlling device 1 inputs the target temperature, the usage record, the operating temperature, the historical record and recommended environment temperature, the abnormal controlling command and the control parameter to one or more controlling algorithms 11, so as to calculate and generate one or more control commands (step S46). Then, the intelligent controlling device 1 controls the air-conditioning 2 according to the one or more control commands, so as to improve the comfort characteristic of the entire space, or improve the comfort characteristic of the specific zone of the space. Therefore, it can reach a balance between energy saving and comfort characteristic.

In a first preferred embodiment, the cloud server 6 presets that a weight of the target temperature occupied in the control command is 40%. If the user 51 executes a manual operation through the manual controlling interface 12, the cloud server 6 increases or decreases the weight of the target temperature occupied in the control command in accordance with the user's manual operation.

In a second preferred embodiment, the cloud server 6 calculates a usage recorded temperature corresponding to the above mentioned usage record. The cloud server 6 in this embodiment presets that a weight of the usage recorded temperature occupied in the control command is 30%. In particularly, if there are several usage records, the weights summed by the several usage recorded temperature corresponding to the usage records does not exceed 30%. Also, if the user 51 executes the manual operation through the manual controlling interface 12, the cloud server 6 increases or decreases the weight of the usage recorded temperature occupied in the control command in accordance with the user's manual operation.

In a third embodiment, the cloud server 6 calculates a history temperature corresponding to the above mentioned historical record and recommended environment temperature. The cloud server 6 in this embodiment presets that a weight of the history temperature occupied in the control command is 30%. Also, if the user 51 executes the manual operation through the manual controlling interface 12, the cloud server 6 increases or decreases the weight of the history temperature occupied in the control command in accordance with the user's manual operation.

In a fourth embodiment, because the operating temperature set by the manager may not exist, the cloud server 6 does not preset a weight of the operating temperature occupied in the control command. After inquiring the central server and determines that the operating temperature is set by the manager, the cloud server 6 may receive a setting from the manager for applying a weight of the operating temperature occupied in the control command (for example, 20%). In this embodiment, if the operating temperature exists, the cloud server 6 needs to adjust the weights of the target temperature, the usage recorded temperature and the history temperature. In other words, the weights summed by the weights of the operating temperature, the target temperature, the usage recorded temperature and the history temperature does not exceed 100%.

It should be mentioned that the abnormal controlling command indicates environmental abnormal situations of the space defined by the intelligent controlling device 1, for example, the CO2 quantity is too high, the indoor temperature is too high, etc. The abnormal controlling command is pre-established in the intelligent controlling device 1. If the intelligent controlling device 1 determines that one of the environmental abnormal situations occurs in the current environment according to the environment information, it enables a starting flag of the abnormal controlling command (for example, set the starting flag to 1 (TRUE)). Otherwise, the intelligent controlling device 1 disables the starting flag (for example, set the starting flag to 0 (FAULT)) if determining the current environment is in a normal situation.

The cloud server 6 in this embodiment presets that a weight of the abnormal controlling command occupied in the control command is 100%, and grants the abnormal controlling command a top authority. If one of the environmental abnormal situations occurs and the starting flag of the abnormal controlling command is enabled, the intelligent controlling device 1 in this case ignores the target temperature, the operating temperature, the usage recorded temperature and the history temperature, and directly applies the abnormal controlling command as the control command. Therefore, the intelligent controlling device 1 can solve the environmental abnormal situation at the first time by controlling the air-conditioning 2 through the control command when one of the environmental abnormal situations occurs.

As described above, in a default situation, a first calculation formula used by the intelligent controlling device 1 for calculating the control command is disclosed as following:

> First calculation formula=["the target temperature*a first weight"+"the usage recorded temperature*a second weight"+"the history temperature*a third weight"+"the abnormal controlling command*100%*the starting flag"].

In a situation that the starting flag is disabled, and the user 51 does not execute the manual operation, the first weight is pre-defined as 40%, the second weight is pre-defined as 30%, and the third weight is pre-defined as 30%. Besides, if the starting flag is enabled, the first weight, the second weight and the third weight are reset to zero, in other words, the abnormal controlling command is directly regarded as the control command (a weight of the abnormal controlling command is 100%).

If the operating temperature set by the manager exists, then a second calculation formula used by the intelligent controlling device 1 for calculating the control command is disclosed as following:

> Second calculation formula=["the target temperature*a first weight"+"the usage recorded temperature*a second weight"+"the history temperature*a third weight"+"the operating temperature*a fourth weight"+"the abnormal controlling command*100%*the starting flag"].

In this case, a sum of the first weight, the second weight, the third weight and the fourth weight is 100%, and the operating temperature is usually lower than the target temperature. Besides, as described above, if the starting flag is enabled, the first weight, the second weight, the third weight and the fourth weight are reset to zero, in other words, the abnormal controlling command is directly regarded as the control command.

According to the above calculated control command, the air-conditioning 2 can solve the environment abnormal situations occur in the space, or improve the comfort characteristic of the entire space through a regular operation, or only improve the comfort characteristic of one or more specific zones in the space through an economic operation.

As described above, take the air-conditioning 2 for an instance, the control command for the air-conditioning 2 at least comprises the types of "turns on the air-conditioning 2", "sets the temperature", "switches the modes", "adjusts the fan speed", "adjusts the fan direction", etc., and each control command is respectively corresponding to the plurality of controlling algorithms 11 of the intelligent controlling device 1. In this embodiment, the air-conditioning 2 has two controlling methods. One of the two controlling methods is to control the air-conditioning 2 manually through the manual controlling interface 12 after the user 51 enters the space. The other one of the two controlling methods is to determine if the air-conditioning 2 needs to be controlled by the intelligent controlling device 1 based on the environment information and the user information from the indoor environment sensing unit 10, the plurality of sensing devices 3 and the temperature sensing unit 40, and if the intelligent controlling device 1 determines to control the air-conditioning 2, it obtains the corresponding controlling algorithm 11 for calculating the corresponding control command, and then controls the air-conditioning 2 by the calculated control command.

Figure 7:
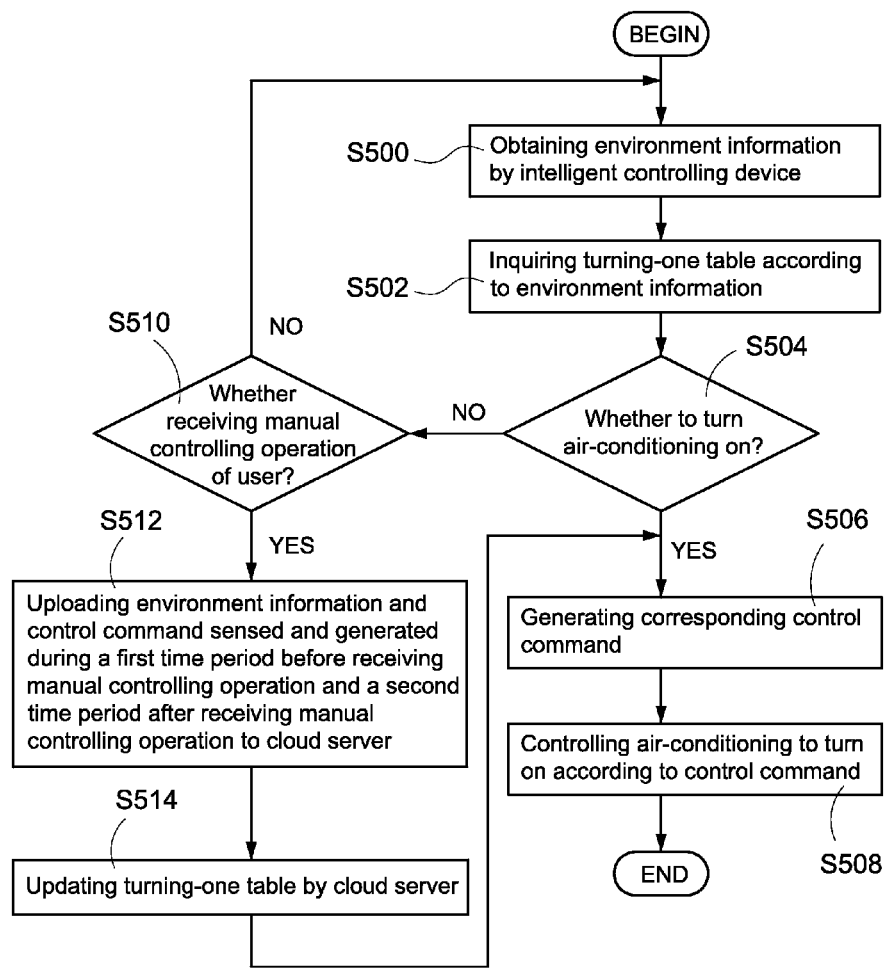
FIG. 7 is an intelligent controlling flowchart of third embodiment according to the present invention.

Refers to FIG. 7, FIG. 7 is an intelligent controlling flowchart of third embodiment according to the present invention. An embodiment shown in FIG. 7 discloses a controlling flow for turning on the air-conditioning 2 automatically by the intelligent controlling device 1 through the control command.

In this embodiment, the intelligent controlling device 1 first obtains the environment information (step S500), and inquires a pre-established turning-on table by using the obtained environment information (step S502). The environment information may comprise the status information of the light detecting apparatus, the indoor temperature, the pressure information, the CO2 quantity information, etc., but not limited thereto. In the step S502, the intelligent controlling device 1 uses the environment information to compare with a fixed amount recorded in the turning-on table, so as to determine whether to turn the air-conditioning 2 on or not (step S504).

In one embodiment, the intelligent controlling device 1 determines a person enters the space and turns the air-conditioning 2 on when an instant difference of the status information is higher than a first fixed amount, an instant difference of the pressure information is higher than a second fixed amount, and the CO2 quantity information in a unit time is higher than a third fixed amount. In this embodiment, the first fixed amount, the second fixed amount and the third fixed amount are respectively recorded in the turning-on table.

In particularly, the turning-on table is separated into multiple parts according to time. For an instance, a day has 24 hours, an hour has 60 minutes, so if one part is defined by 20 minutes, the turning-on table can be separated into 72 parts, wherein each part respectively records one first fixed amount, one second fixed amount and one third fixed amount. In other words, each of the 72 parts may have different first fixed amount, second fixed amount and third fixed amount. In the step S502, the intelligent controlling device 1 first makes sure the current time, and obtains corresponding part of the turning-on table according to the current time, then obtains the first fixed amount, the second fixed amount and the third fixed amount recorded in the obtained part, so as to compare the environment information with the obtained first fixed amount, the second fixed amount and the third fixed amount.

If the intelligent controlling device 1 determines to turn the air-conditioning 2 on in the step S504, it generates the corresponding control command (step S506), and controls the air-conditioning 2 to turn on according to the control command (step S508).

If the intelligent controlling device 1 determines not to turn on the air-conditioning 2 in the step S504, it further determines if receiving a manual controlling operation from the user 51 or not (step S510), wherein the manual controlling operation can be an operation inputted through the manual controlling interface 12 for turning on the air-conditioning 2. If not receiving the manual controlling operation, the method goes back to the step S500 and keeps determining whether to turn the air-conditioning 2 on or not.

If the intelligent controlling device 1 determines yes in the step S510, means the fixed amounts recorded in the turning-on table are inaccurate, so the intelligent controlling device 1 cannot determine whether to turn the air-conditioning 2 on accurately (i.e., cannot determine if a person enters the space or not accurately). As such, the intelligent controlling device 1 uploads the environment information and the control command sensed and generated in a first time period and a second time period to the cloud server 6 (step S512), wherein the first time period is a period before the manual controlling operation is inputted by the user 51 and the second time period is other period after the manual controlling operation is inputted by the user 51. The cloud server 6 uses the uploaded data to update those fixed amounts in each part of the turning-on table, and transmits the updated turning-on table to the intelligent controlling device 1 (step S514). In this case, the intelligent controlling device 1 first generates the control command according to the manual controlling operation, and controls the air-conditioning 2 through the control command.

It should be mentioned that the cloud server 6 can first update the turning-on table (basically, the turning-on table stored in the cloud server 6 is updated), and transmits the updated turning-on table to the intelligent controlling device 1 after the turning-on table is updated for certain times (i.e., after the user 51 inputs the manual controlling operation several times). Therefore, the cloud server 6 can update the turning-on table stored in the intelligent controlling device 1.

Figure 8:
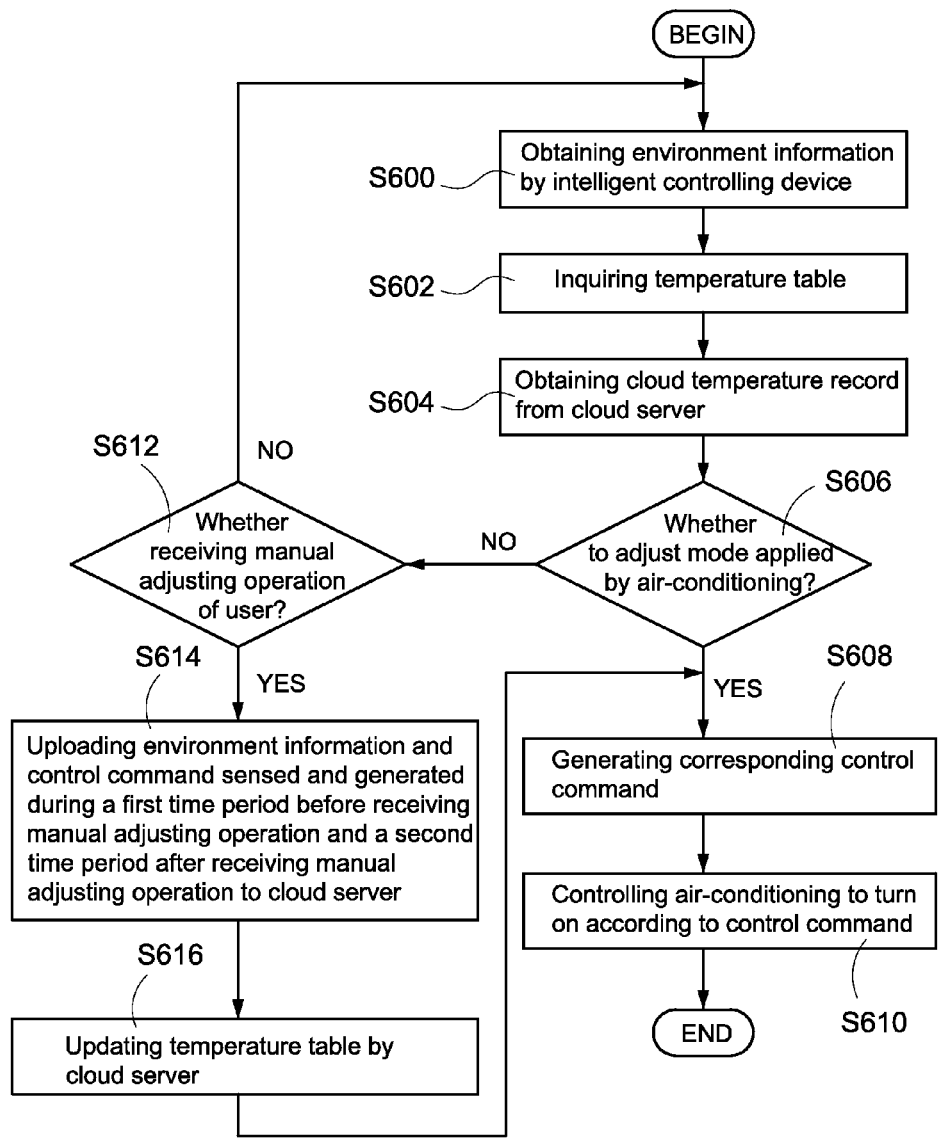
FIG. 8 is an intelligent controlling flowchart of fourth embodiment according to the present invention.

Refers to FIG. 8, FIG. 8 is an intelligent controlling flowchart of fourth embodiment according to the present invention. An embodiment shown in FIG. 8 discloses a controlling flow for switching modes of the air-conditioning 2 automatically by the intelligent controlling device 1 through the control command.

The intelligent controlling device 1 first obtains the environment information (step S600), and inquires a pre-established temperature table (step S602), and simultaneously obtains a cloud temperature record from the cloud server 6 (step S604). Then, the intelligent controlling device 1 determines whether to adjust the mode applied by the air-conditioning 2 according to the environment information, the temperature table and the cloud temperature record (step S606).

In this embodiment, the environment may comprise the indoor temperature, the indoor humidity, the pressure information, etc. The cloud temperature record may comprise history temperature and humidity data of the space at the same time in the past (for example, the same time in last year). The temperature table is pre-established in the intelligent controlling device 1, and it is separated into several parts based on time. The separation of the temperature table is similar to the above mentioned turning-on table, and each part of the temperature table respectively records an initial temperature and humidity data. In other words, each of the several parts may have different initial temperature and humidity data.

The intelligent controlling device 1 in this embodiment first makes sure the current time, obtains the history temperature and humidity data corresponding to the current time from the cloud temperature record, and inquires the temperature table for obtaining the initial temperature and humidity data corresponding to the current time. Then, the intelligent controlling device 1 calculates one or more thresholds in accordance with the history temperature and humidity data (preset to 50% occupied in this calculation) and the initial temperature and humidity data (preset to 50% occupied in this calculation). In this embodiment, the one or more thresholds can comprise a turning on cooling mode temperature threshold, a turning on heating mode temperature threshold, a turning on dehumidifying mode humidity threshold, a turning on humidifying mode humidity threshold, a turning off cooling mode humidity threshold, a turning off heating mode humidity threshold, etc.

In the step S606, the intelligent controlling device 1 first calculates the above thresholds, and determines to switch the mode applied by the air-conditioning 2 when a result of comparing the environment information with those thresholds matches with one of a plurality of switching conditions. If determining to switch the mode applied by the air-conditioning 2, the intelligent controlling device 1 generates the control command according to the matched switching condition (step S608), and controls the air-conditioning 2 to switch the applied mode according to the control command (step S610).

In this embodiment, a turning on cooling mode condition is matched when the indoor temperature is higher than the turning on cooling mode temperature threshold. A turning on blowing mode condition is matched when the turning on heating mode temperature threshold is lower than the indoor temperature, and the indoor temperature is lower than the turning on cooling mode temperature threshold. A turning on heating mode condition is matched when the indoor temperature is lower than the turning on heating mode temperature threshold. A turning on dehumidifying mode condition is matched when the indoor humidity is higher than the turning on dehumidifying mode humidity threshold. A turning on humidifying mode condition is matched when the indoor humidity is lower than the turning on humidifying mode humidity threshold. A turning off cooling mode condition is matched when the indoor humidity is lower than the turning off cooling mode humidity threshold. A turning off heating mode condition is matched when the indoor humidity is higher than the turning off heating mode humidity threshold. However, the above descriptions are just embodiments of the present invention, not intended to limit the scope of the present invention.

If determining not to switch the mode applied by the air-conditioning 2 in the step S606, the intelligent controlling device 1 further determines if receiving an manual adjusting operation from the user 51 or not (step S612), wherein the manual adjusting operation can be an operation inputted through the manual controlling interface 12 for adjusting the mode applied by the air-conditioning 2. If not receiving the manual adjusting operation, the method goes back to the step S600 and keeps determining whether to switch the mode applied by the air-conditioning 2 or not.

If the intelligent controlling device 1 determines yes in the step S612, means the initial temperature and humidity data recorded in the temperature table are inaccurate, so the intelligent controlling device 1 cannot determine whether to switch the mode applied by the air-conditioning 2 accurately. As such, the intelligent controlling device 1 uploads the environment information and the control command sensed and generated in a first time period and a second time period to the cloud server 6 (step S614), wherein the first time period is a period before the manual adjusting operation is inputted by the user 51 and the second time period is other period after the manual adjusting operation is inputted by the user 51. The cloud server 6 uses the uploaded data to update those initial temperature and humidity data in each part of the temperature table, and transmits the updated temperature table to the intelligent controlling device 1 (step S616). In this case, the intelligent controlling device 1 first generates the control command according to the manual adjusting operation, and controls the air-conditioning 2 through the control command.

A method applied for inquiring and updating the temperature table is similar to that of the turning-on table described above, no more detailed discussion is disclosed in this embodiment.

Figure 9:
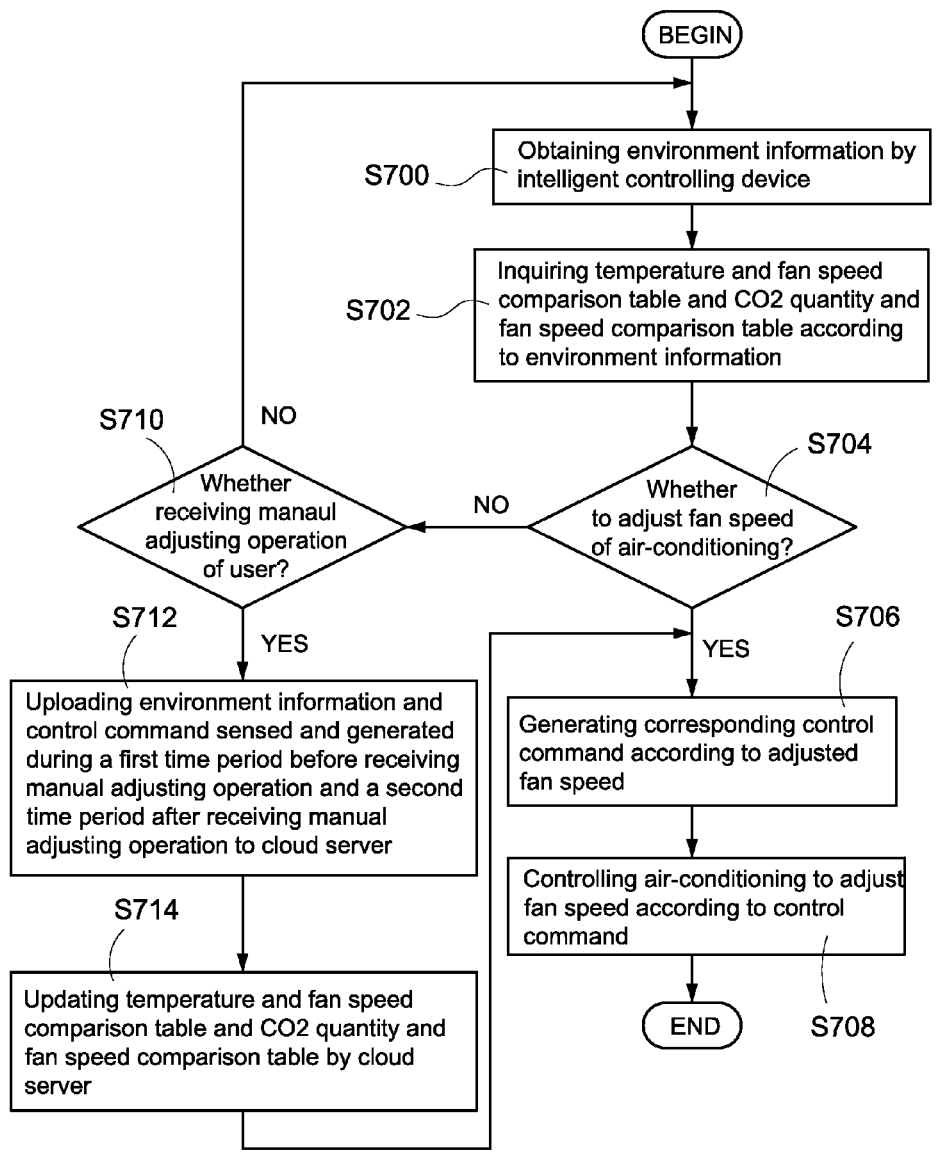
FIG. 9 is an intelligent controlling flowchart of fifth embodiment according to the present invention.

Refers to FIG. 9, FIG. 9 is an intelligent controlling flowchart of fifth embodiment according to the present invention. An embodiment shown in FIG. 9 discloses a controlling flow for adjusting fan speed of the air-conditioning 2 automatically by the intelligent controlling device 1 through the control command.

The intelligent controlling device 1 first obtains the environment information (step S700), and inquires a pre-established temperature and fan speed comparison table and a pre-established CO2 quantity and fan speed comparison table by using the environment information (step S702). In this embodiment, the environment information may comprise the indoor temperature, the CO2 quantity information, the PM2.5 quantity information, the TVOC quantity information, etc., but not limited thereto. In the step S702, the intelligent controlling device 1 compares the environment information with the temperature and fan speed comparison table and the CO2 quantity and fan speed comparison table, so as to determine whether to adjust the fan speed of the air-conditioning 2 (step S704).

In a first embodiment, the intelligent controlling device 1 increases the fan speed of the air-conditioning 2 if a first temperature difference between a first temperature sensed by the beacons 31 and a second temperature sensed by the indoor environment sensing unit 10 is higher than a preset threshold. In this case, the temperature difference indicates that the environment temperature of the space is not average. Also, the intelligent controlling device 1 decreases the fan speed of the air-conditioning 2 if the first temperature difference between the first temperature and the second temperature is getting lower.

In a second embodiment, the intelligent controlling device 1 can increase the fan speed of the air-conditioning 2 when a second temperature difference between the first temperature sensed by the beacons 31 and the target temperature is higher than the preset threshold, and decrease the fan speed when the second temperature difference is getting lower.

It should mentioned that the intelligent controlling device 1 in the step S704 inquires the temperature and fan speed comparison table by using a temperature difference among the temperatures sensed by the plurality of sensing devices 3, so as to determine whether to adjust the fan speed of the air-conditioning 2. The temperature and fan speed comparison table in this embodiment records a corresponding data that indicates the relationship between the temperature difference and the fan speed, for example, indicates to switch the fan speed to MIDDLE if the temperature difference is higher than 3° C., or to switch the fan speed to HIGH if the temperature difference is higher than 5° C. Also, the temperature and fan speed comparison table is similar to the above mentioned turning-on table and temperature table, no more detailed discussion is disclosed in this embodiment.

In a third embodiment, the intelligent controlling device 1 can increase the fan speed of the air-conditioning 2 when the CO2 quantity sensed by the indoor environment sensing unit 10 is getting higher, and decrease the fan speed of the air-conditioning 2 when the CO2 quantity is getting lower. In this embodiment, the CO2 quantity and fan speed comparison table records a corresponding data that indicates the relationship between the CO2 quantity and the fan speed. The CO2 quantity and fan speed comparison table is similar to the above mentioned temperature and fan speed comparison table, no more detailed discussion is disclosed in this embodiment.

In a fourth embodiment, the intelligent controlling device 1 can increase the fan speed of the air-conditioning 2 when the PM2.5 quantity or the TVOC quantity sensed by the indoor environment sensing unit 10 is too high, so as to increase indoor air circulation. The intelligent controlling device 1 can also set a flag of an air cleaning function to 1 (TRUE), so as to increase the amount the indoor air flowing through the filters in the air-conditioning 2. In this embodiment, the CO2 quantity and fan speed comparison table records a corresponding data that indicates the relationship between the PM2.5 quantity or the TVOC quantity and the fan speed.

If the intelligent controlling device 1 in the step S704 determines to adjust the fan speed of the air-conditioning 2, it then generates the corresponding control command according to the wanted-to-adjust fan speed (step S706), and controls the air-conditioning 2 to adjust the current applied fan speed according to the control command (step S708).

It should be mentioned that if the above discussed situations occur simultaneously (for example, the temperature difference is too high, the CO2 quantity is too high, and also the PM2.5 quantity is too high), the intelligent controlling device 1 can obtain several fan speeds after inquiring the temperature and fan speed comparison table and the CO2 quantity and fan speed comparison table, and generates the control command in accordance with the multiple fan speeds. For example, the intelligent controlling device 1 obtains a first fan speed because of the high temperature difference, obtains a second fan speed because of the high CO2 quantity, and obtains a third fan speed because of the high PM2.5 quantity. In this case, the intelligent controlling device 1 generates the control command in accordance with all of the three fan speeds. For example, a calculating formula for calculating the control command can be: ["the first fan speed*30%"+"the second fan speed*30%"+"the third fan speed*40%"]. However, the above descriptions are just embodiments of the present invention, but not intended to limit the scope of the present invention.

If determining not to adjust the fan speed of the air-conditioning 2 in the step S704, the intelligent controlling device 1 further determine if receiving the manual adjusting operation from the user 51 (step S710). The manual adjusting operation in this embodiment can be an operation inputted through the manual controlling interface 12 for adjusting the fan speed of the air-conditioning 2. If not receiving the manual adjusting operation, the method goes back to the step S700 and keeps determining whether to adjust the fan speed of the air-conditioning 2 or not.

If the intelligent controlling device 1 determines yes in the step S710, means the data recorded in the temperature and fan speed comparison table and/or the CO2 quantity and fan speed comparison table are inaccurate, so the intelligent controlling device 1 cannot determine whether to adjust the fan speed of the air-conditioning 2 accurately. As such, the intelligent controlling device 1 uploads the environment information and the control command sensed and generated in a first time period and a second time period to the cloud server 6 (step S714), wherein the first time period is a period before the manual adjusting operation is inputted by the user 51 and the second time period is other period after the manual adjusting operation is inputted by the user 51. The cloud server 6 uses the uploaded data to update the temperature and fan speed comparison table and/or the CO2 quantity and fan speed comparison table, and transmits the updated temperature and fan speed comparison table and/or the CO2 quantity and fan speed comparison table to the intelligent controlling device 1 (step S714). In this case, the intelligent controlling device 1 first generates the control command according to the manual adjusting operation, and controls the air-conditioning 2 through the control command.

Figure 10:
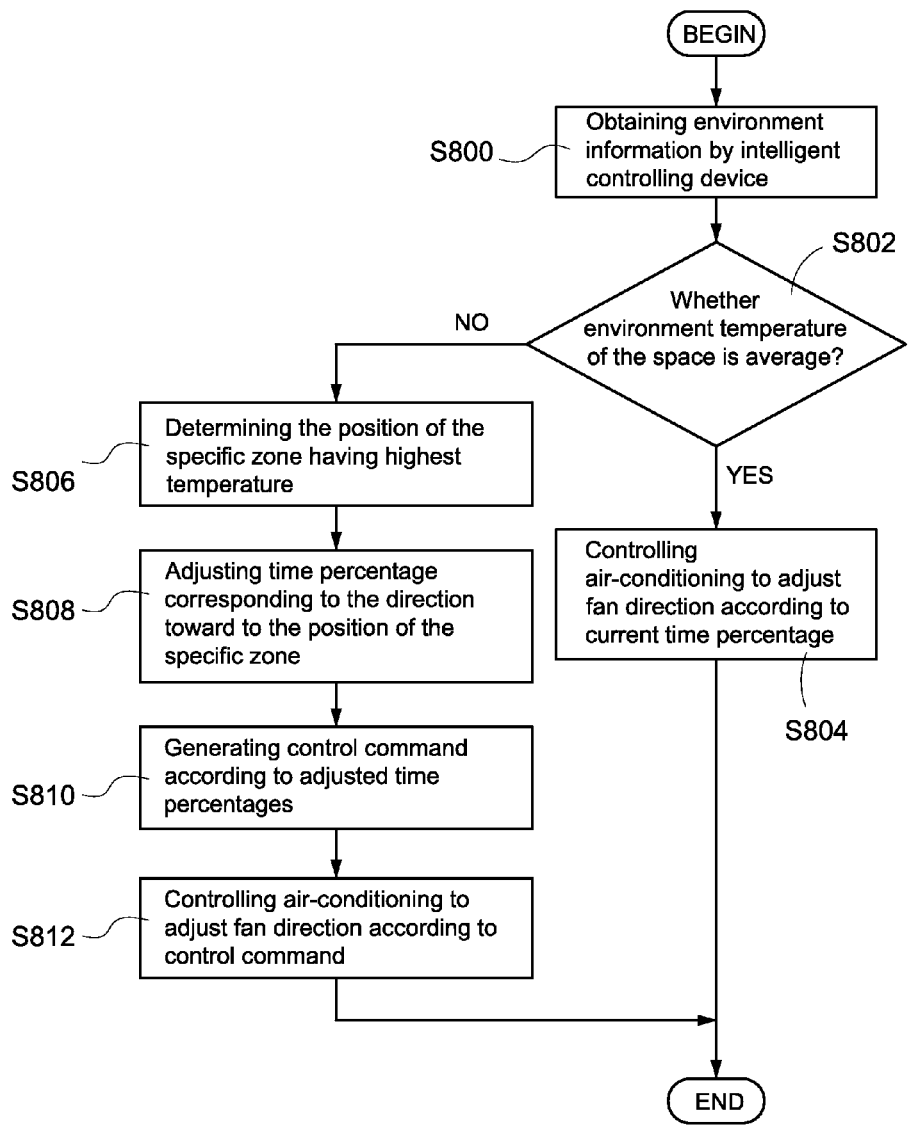
FIG. 10 is an intelligent controlling flowchart of sixth embodiment according to the present invention.

FIG. 10 is an intelligent controlling flowchart of sixth embodiment according to the present invention. An embodiment shown in FIG. 10 discloses a controlling flow for adjusting fan direction of the air-conditioning 2 automatically by the intelligent controlling device 1 through the control command.

The intelligent controlling device 1 first obtains the environment information (step S800), and then determines whether the current environment temperature of the space is average or not according to the environment information (step S802). Particularly, the intelligent controlling device 1 obtains temperatures of each zone in the space separately from the indoor environment sensing unit 10, the plurality of beacons 31 and the temperature sensing unit 40, and determines whether the current environment temperature of the space is average or not according to a temperature difference among the temperatures of each zone. If determining yes in the step S802, the intelligent controlling device 1 controls the air-conditioning 2 to adjust the fan direction according to a current time percentage (step S804).

In this embodiment, the fan direction applied by the air-conditioning 2 can be separated into multiple parts, each part is respectively corresponding to one of a plurality of directions, and each direction is initially distributed one of a plurality of time percentages. For example, if the fan direction is separated into five parts, then the five parts are respectively corresponding to five directions (such as left, partial left, middle, partial right, right), and each time percentage of each part is 20%. The intelligent controlling device 1 in this embodiment controls the staying time the air-conditioning 2 blows toward to each direction according to the time percentages of each part of the fan direction. If determining the current environment temperate of the space is average in the step S804, the intelligent controlling device 1 controls the air-conditioning 2 to adjust the fan direction in a balanced way (for example, staying five seconds for each direction).

If determining no in the step S804, the intelligent controlling device 1 determines a position of a specific zone having the highest temperature (step S806), and adjusts one of the plurality of time percentages corresponding to the direction toward to the position of the specific zone (step S808), for example, increases that time percentage from 20% to 30%. Then, the intelligent controlling device 1 generates the control command according to the adjusted time percentages (step S810), and controls the air-conditioning 2 to adjust the fan direction through the control command (step S812). It should be mentioned that if the intelligent controlling device 1 increases anyone of the plurality of time percentage corresponding to one of the plurality of directions, the other time percentages corresponding to other directions need to be decreased. In other words, a value summed by all of the plurality of time percentages corresponding to all of the plurality of directions needs to be kept at 100%.

As the skilled person will appreciate, various changes and modifications can be made to the described embodiment. It is intended to include all such variations, modifications and equivalents which fall within the scope of the present invention, as defined in the accompanying claims.

What is claimed is:

1. An intelligent air-conditioning controlling system arranged in a space, comprising:
a plurality of sensing devices, respectively sensing environment information and user information of the space;
an intelligent controlling device connected with the plurality of sensing devices wirelessly for receiving the environment information and the user information, and calculating a target comfort characteristic according to the environment information;
an air-conditioning connected with the intelligent controlling device wirelessly for operating according to a control command received from the intelligent controlling device; and
a cloud server receiving the environment information and the user information from the intelligent controlling device, obtaining a usage recorded temperature corresponding to the user information, and calculating a historical record and recommended environment comfort characteristic, wherein the historical record and recommended environment comfort characteristic is a best comfort characteristic applied for the space in current time and current environment found out by the cloud server after executing a big data analysis based on the environment information;
wherein, the intelligent controlling device receives the usage recorded temperature, the historical record and recommended environment comfort characteristic, and a control parameter from the cloud server, and generates the control command according to the target comfort characteristic, the usage recorded temperature, the historical record and recommended environment comfort characteristic, and the control parameter, wherein the control parameter records weights of the target comfort characteristic, the usage recorded temperature, and the historical record and recommended environment comfort characteristic respectively occupied in the control command.

2. The intelligent air-conditioning controlling system in claim 1, wherein a first weight preset for the target comfort characteristic occupied in the control command is 40%, a second weight preset for the usage recorded temperature occupied in the control command is 30%, a third weight preset for the historical record and recommended environment comfort characteristic occupied in the control command is 30%, and the intelligent air-conditioning controlling system further comprises a manual controlling interface, and the manual controlling interface receives a manual adjusting operation for respectively adjusting the first weight, the second weight and the third weight.

3. The intelligent air-conditioning controlling system in claim 1, wherein the plurality of sensing devices at least comprises a plurality of beacons, the plurality of beacons are respectively arranged in different zones of the space, and connected with the intelligent controlling device wirelessly through bluetooth low energy (BLE) transmission protocol, each of the plurality of beacons comprises a temperature and humidity sensor for sensing the environment information around the arranged zone, wherein the environment information at least comprises indoor temperature information and indoor humidity information.

4. The intelligent air-conditioning controlling system in claim 1, wherein the plurality of sensing devices at least comprises a user information sensing mobile device, the user information sensing mobile device senses the user information of a user located in the space, and connects with the intelligent controlling device wirelessly through BLE transmission protocol, wherein the user information at least comprises body temperature and heartbeat of the user.

5. The intelligent air-conditioning controlling system in claim 4, wherein the user information further comprises an identification information, the cloud server identifies an identity of the user according to the identification information, and obtains the usage recorded temperature corresponding to the user in the space.

6. The intelligent air-conditioning controlling system in claim 5, wherein the identification information is an employee identification number, an international mobile equipment identity (IMEI), a media access control (MAC) address of a network card or a bluetooth transmission unit, and the user information sensing mobile device is an employee identification card, a smart phone, a tablet, a laptop or a smart watch.

7. The intelligent air-conditioning controlling system in claim 4, wherein the intelligent controlling device obtains an operating mode set by a manager for the space, and changes the operating mode into an operating temperature according to a pre-stored mode mapping table, and calculates the control command in accordance with the target comfort characteristic, the usage recorded temperature, the operating temperature, the historical record and recommended environment comfort characteristic and the control parameter, wherein the control parameter records the weights of the target comfort characteristic, the usage recorded temperature, the operating temperature and the historical record and recommended environment comfort characteristic respectively occupied in the control command, and the a sum of the weights is 100%.

8. The intelligent air-conditioning controlling system in claim 1, wherein the intelligent controlling device comprises an indoor environment sensing unit, the indoor environment sensing unit is used to sense the environment information around the intelligent controlling device, and the environment information sensed by the indoor environment sensing unit comprises CO2 quantity information, PM2.5 quantity information and TVOC quantity information.

9. The intelligent air-conditioning controlling system in claim 8, wherein the intelligent controlling device enables a starting flag of an abnormal controlling command when determining an environmental abnormal situation occurs in the space according to the environment information, and regards the abnormal controlling command as the control command directly when the starting flag of the abnormal controlling command is enabled.

10. An intelligent controlling method applied by an intelligent air-conditioning controlling system, the intelligent air-conditioning controlling system arranged in a space and comprising an intelligent controlling device, an air-conditioning, a plurality of sensing devices for respectively sensing environment information and user information, and a cloud server, and the intelligent controlling method comprising:
   a) obtaining the environment information and the user information respectively from the plurality of sensing devices by the intelligent controlling device;
   b) calculating a target comfort characteristic according to the environment information;
   c) uploading the environment information and the user information to the cloud server;
   d) obtaining a usage recorded temperature corresponding to the user information by the cloud server;
   e) calculating a historical record and recommended environment comfort characteristic, wherein the historical record and recommended environment comfort characteristic is a best comfort characteristic applied for the space in current time and current environment found out by the cloud server after executing a big data analysis based on the environment information;
   f) transmitting the usage recorded temperature, the historical record and recommended environment comfort characteristic, and a control parameter to the intelligent controlling device, wherein the control parameter records weights of the target comfort characteristic, the usage recorded temperature, and the historical record and recommended environment comfort characteristic respectively occupied in the control command;
   g) calculating a control command in accordance with the target comfort characteristic, the usage recorded temperature, the historical record and recommended environment comfort characteristic, and the control parameter by the intelligent controlling device; and
   h) controlling the air-conditioning to operate according to the control command.

11. The intelligent controlling method in claim 10, wherein the environment information at least comprises indoor temperature information and indoor humidity information, the user information at least comprises body temperature and heartbeat of a user located in the space.

12. The intelligent controlling method in claim 11, wherein the user information further comprises an identification information; in the step d, the cloud server identifies an identity of the user according to the identification information, and obtains the usage recorded temperature corresponding to the user in the space.

13. The intelligent controlling method in claim 11, wherein further comprises following steps:
   i1) determining whether to turn the air-conditioning on by inquiring a turning-on table according to the environment information;
   i2) generating the corresponding control command to control the air-conditioning when determining to turn on the air-conditioning;
   i3) determining whether receives a manual controlling operation when determining not to turn on the air-conditioning;
   i4) transmitting the environment information and the control command sensed and generated during a first time period before receiving the manual controlling operation and a second time period after receiving the manual controlling operation to the cloud server if receiving the manual controlling operation; and
   i5) updating the turning-on table according to the environment information and the control command by the cloud server.

14. The intelligent controlling method in claim 13, wherein the environment information further comprises status information of a light detecting apparatus of the space, CO2 quantity information and pressure information, the turning-on table is separated into multiple parts according to time, each part respectively records a first fixed amount corresponding to the status information, a second fixed amount corresponding to the CO2 quantity information, and a third fixed amount corresponding to the pressure information; in the step i1, the intelligent controlling device obtains one of the plurality of parts of the turning-on table according to current time, and determines to turn the air-conditioning on if an instant difference of the status information is higher than the first fixed amount of the obtained part, the CO2 quantity information is higher than the second fixed amount of the obtained part, and the pressure information is higher than the third fixed amount of the obtained part.

15. The intelligent controlling method in claim 11, wherein further comprises following steps:
- j1) inquiring a temperature table;
- j2) obtaining a cloud temperature record from the cloud server;
- j3) determining whether to adjust a mode applied by the air-conditioning in accordance with the environment information, the temperature table and the cloud temperature record;
- j4) generating the corresponding control command to control the air-conditioning to switch the mode according to a wanted-to-adjust mode when determine to adjust the mode applied by the air conditioning;
- j5) determining whether receives a manual adjusting operation when determining not to adjust the mode applied by the air-conditioning;
- j6) transmitting the environment and the control command sensed and generated during a first time period before receiving the manual adjusting operation and a second time period after receiving the manual adjusting operation to the cloud server if receiving the manual adjusting operation; and
- j7) updating the temperature table according to the environment information and the control command by the cloud server.

16. The intelligent controlling method in claim 15, wherein the temperature table is separated into multiple parts, each part respectively records an initial temperature and humidity data, and the cloud temperature record comprises a history temperature and humidity data of the space at each time in the past; in the step j1, the intelligent controlling device obtains the corresponding initial temperature and humidity data from the temperature table according to the current time; in the step j2, the intelligent controlling device obtains the corresponding history temperature and humidity data from the cloud temperature record according to the current time; in the step j3, the intelligent controlling device calculates a plurality of thresholds in accordance with the obtained initial temperature and humidity data and the obtained history temperature and humidity data, and determines to adjust the mode applied by the air-conditioning when a result of comparing the environment with the plurality of thresholds matches with one of a plurality of switching conditions, and the intelligent controlling device decides the wanted-to-adjust mode according to the matched switching condition.

17. The intelligent controlling method in claim 11, wherein further comprises following steps:
- k1) determining whether to adjust a fan speed of the air-conditioning by inquiring a temperature and fan speed comparison table according to the environment information;
- k2) determining whether to adjust the fan speed of the air-conditioning by inquiring a CO2 quantity and fan speed comparison table according to the environment information;
- k3) generating the corresponding control command to control the air-conditioning to adjust the fan speed when determining to adjust the fan speed of the air-conditioning;
- k4) determining whether receives a manual adjust operation when determining not to adjust the fan speed of the air-conditioning;
- k5) transmitting the environment and the control command sensed and generated during a first time period before receiving the manual adjusting operation and a second time period after receiving the manual adjusting operation to the cloud server if receiving the manual adjusting operation; and
- k6) updating the temperature and fan speed comparison table and the CO2 quantity and fan speed comparison table according to the environment information and the control command by the cloud server.

18. The intelligent controlling method of claim 17, wherein the environment information further comprises CO2 quantity information; in the step k1, the intelligent controlling device determines whether to adjust the fan speed of the air-conditioning by inquiring the temperature and fan speed comparison table according to a temperature diffrence difference among temperatures respectively sensed by the plurality of sensing devices, and obtains a relationship between the temperature difference and the fan speed; in the step k2, the intelligent controlling device determines whether to adjust the fan speed of the air-conditioning by inquiring the CO2 quantity and fan speed comparison table according to the CO2 quantity information, and obtains a relationship between the CO2 quantity information and the fan speed.

19. The intelligent controlling method in claim 11, wherein further comprises following steps:
- l1) determining whether environment temperature of the space is average according to the environment information;
- l2) obtaining a position of a specific zone having highest temperature according to the plurality of sensing devices when the environment temperature of the space is not average;
- l3) adjusting a time percentage corresponding to a fan direction toward the specific zone, wherein the air-conditioning has multiple fan directions respectively corresponding to different time percentages, and a sum of the multiple time percentages is 100%; and
- l4) generating the corresponding control command to control the air-conditioning to adjust the fan direction according to the adjusted time percentages.

* * * * *